US008634122B2

United States Patent
Watanabe et al.

(10) Patent No.: US 8,634,122 B2
(45) Date of Patent: Jan. 21, 2014

(54) OPTICAL SCANNER, METHOD OF MANUFACTURING OPTICAL SCANNER, AND IMAGE FORMING APPARATUS

(75) Inventors: Emi Watanabe, Shimosuwa (JP); Yasushi Mizoguchi, Suwa (JP); Makiko Hino, Matsumoto (JP)

(73) Assignee: Seiko Epson Corporation (JP)

( * ) Notice: Subject to any disclaimer, the term of this patent is extended or adjusted under 35 U.S.C. 154(b) by 223 days.

(21) Appl. No.: 13/228,839

(22) Filed: Sep. 9, 2011

(65) Prior Publication Data
US 2012/0062969 A1 Mar. 15, 2012

(30) Foreign Application Priority Data

Sep. 10, 2010 (JP) ................................ 2010-202768

(51) Int. Cl.
*G02B 26/08* (2006.01)
(52) U.S. Cl.
USPC ...................... 359/199.3; 359/200.7; 359/900
(58) Field of Classification Search
USPC .................. 359/1–200.8, 221.2, 223.1–226.2
See application file for complete search history.

(56) References Cited

U.S. PATENT DOCUMENTS

2012/0038961 A1* 2/2012 Watanabe et al. .......... 359/198.1

FOREIGN PATENT DOCUMENTS

JP 2005-181395 7/2005

* cited by examiner

*Primary Examiner* — James Phan
(74) *Attorney, Agent, or Firm* — Harness, Dickey & Pierce, P.L.C.

(57) ABSTRACT

An optical scanner includes: a movable section which has a light reflecting member with a light reflecting surface and which is rotatable around the central axis of rotation; at least a pair of movable beams extending from the movable section along the light reflecting surface; a displacement section which is connected to the movable beams and has a through hole including two fixed surfaces crossing each other; two driving beams which extend from the displacement section along a surface direction of the light reflecting surface so as to be perpendicular to the movable beams; a support section connected to each of the driving beams; a driving section which drives the displacement section; and a permanent magnet which is inserted in the through hole and is fixed to the two fixed surfaces.

9 Claims, 15 Drawing Sheets

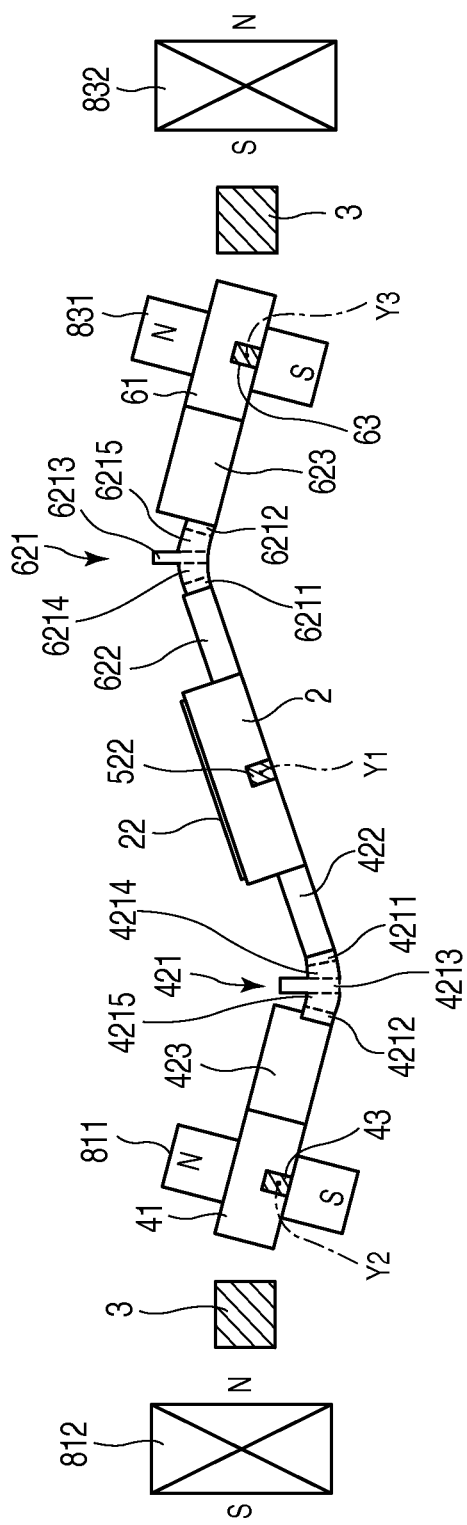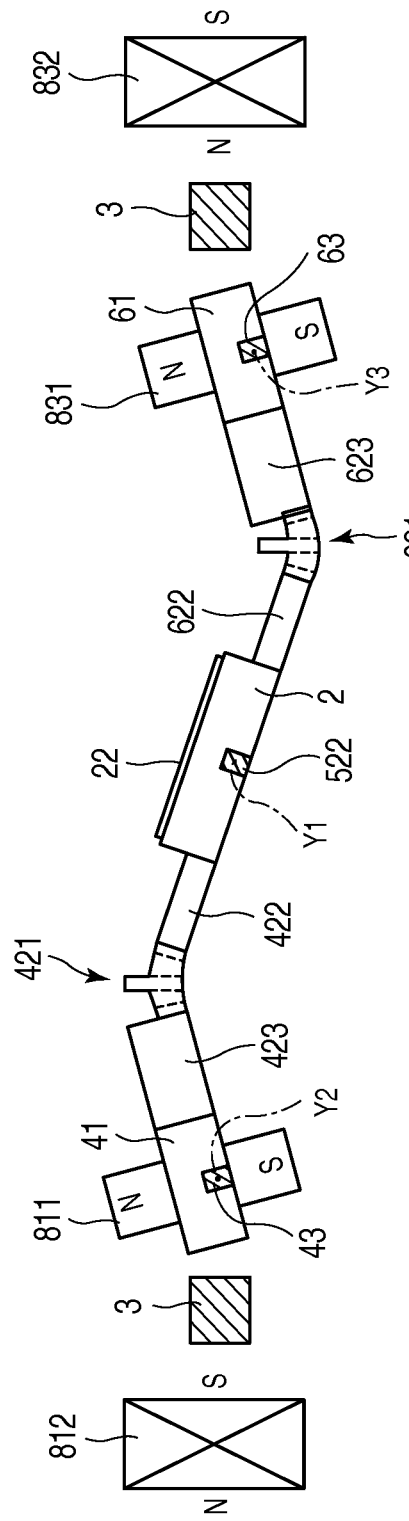
FIG. 9A
FIG. 9B

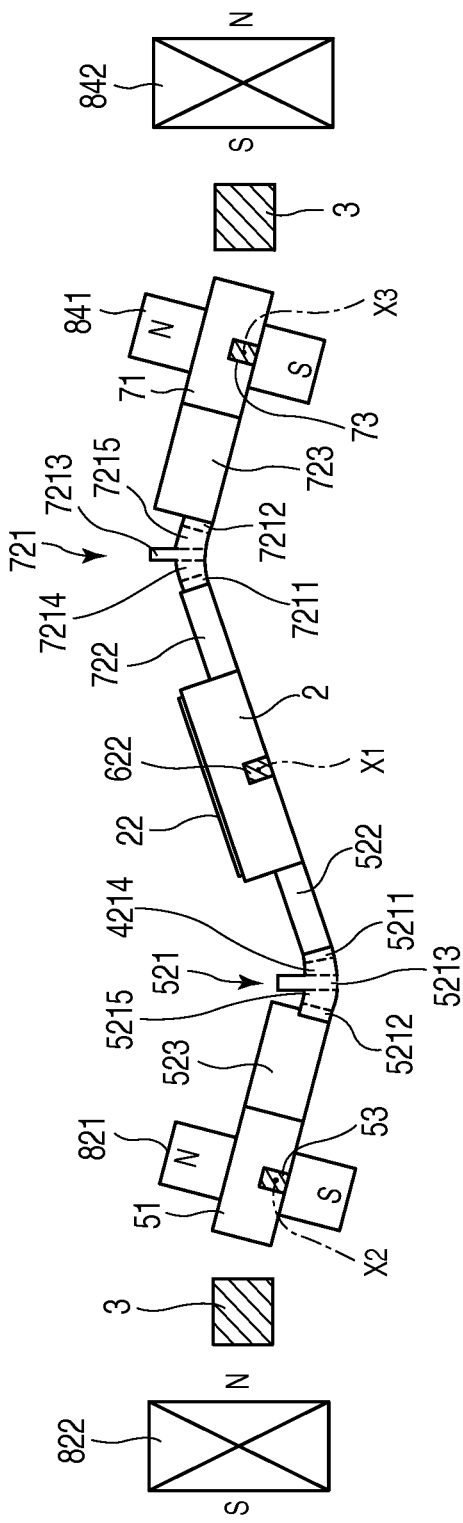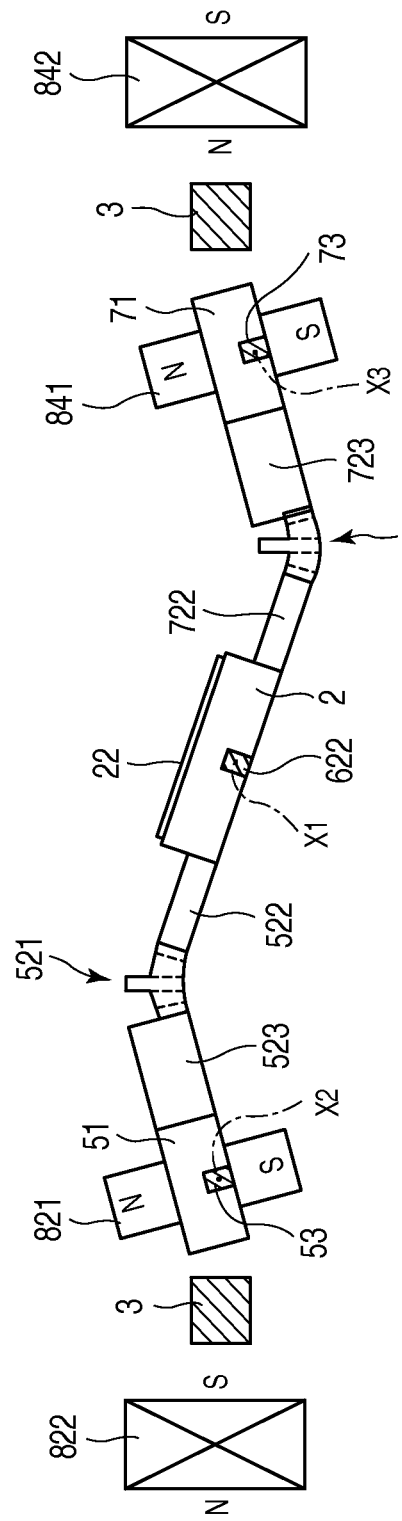
FIG. 10A
FIG. 10B

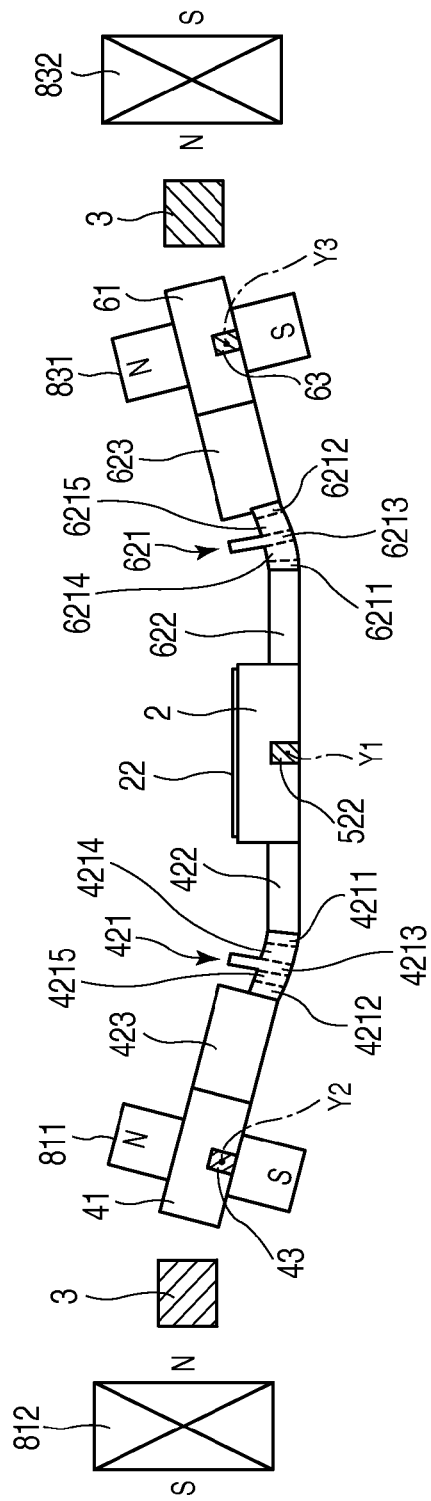
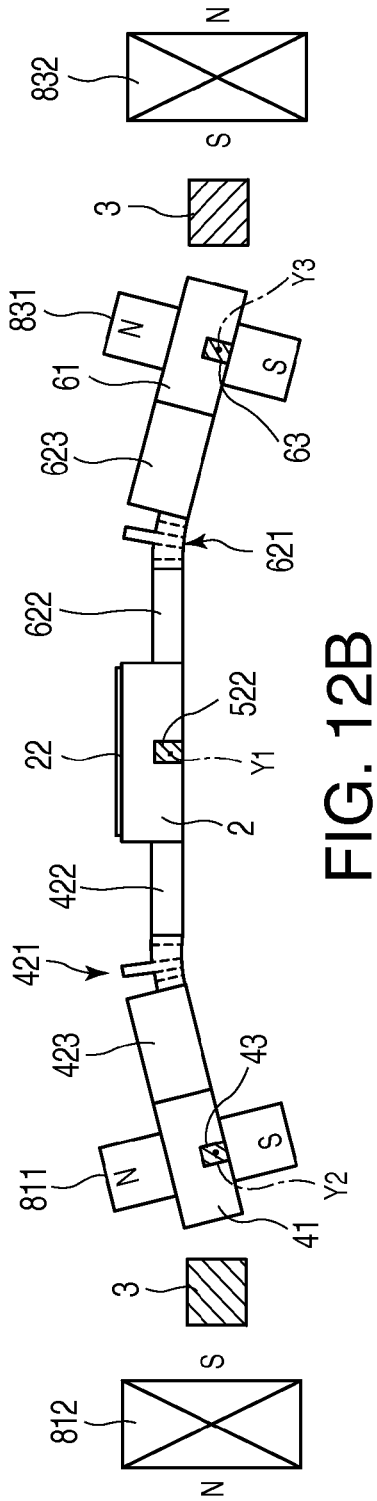

OPTICAL SCANNER, METHOD OF MANUFACTURING OPTICAL SCANNER, AND IMAGE FORMING APPARATUS

BACKGROUND

1. Technical Field

The invention relates to an optical scanner, a method of manufacturing an optical scanner, and an image forming apparatus.

2. Related Art

As an example of an optical scanner which performs drawing by light scanning in a laser printer or the like, an optical scanner which is formed by a torsional oscillator and which uses an actuator is known (for example, refer to JP-A-2005-181395).

JP-A-2005-181395 discloses an actuator including an insulating substrate, in which a pair of permanent magnets is provided, and a scanner body, which is supported on the insulating substrate so as to be located between the pair of permanent magnets. In addition, the scanner body has a frame-like support section, a frame-like outer movable plate provided inside the support section, and an inner movable plate (mirror) provided inside the outer movable plate. In addition, the outer movable plate is connected to the support section through a pair of first torsion bars which extends in the X-axis direction, and the inner movable plate is connected to the outer movable plate through a second torsion bar which extends in the Y-axis direction crossing the X-axis direction. In addition, a coil is provided in each of the outer movable plate and the inner movable plate.

In the actuator with such a configuration, a magnetic field generated from each coil by application of an electric current and a magnetic field generated between the pair of permanent magnets act. As a result, the outer movable plate rotates around the X axis together with the inner movable plate with the first torsion bar as a central axis, and the inner movable plate rotates around the Y axis with the second torsion bar as a central axis.

Thus, in the actuator disclosed in JP-A-2005-181395, the mechanism for rotating the inner movable plate around the X axis is different from the mechanism for rotating the inner movable plate around the Y axis. For this reason, it is not possible to rotate the inner movable plate around the X and Y axes under the same conditions. In addition, in the actuator disclosed in JP-A-2005-181395, the magnetic field generated from the coil provided in the outer movable plate and the magnetic field generated from the coil provided in the inner movable plate interfere with each other. For this reason, it is not possible to rotate the inner movable plate independently around each of the X and Y axes. Accordingly, in the actuator disclosed in JP-A-2005-181395, there is a problem in that it is not possible to rotate the inner movable plate stably around each of the X and Y axes.

SUMMARY

An advantage of some aspects of the invention is to provide an optical scanner and an image forming apparatus capable of rotating movable plates stably around each of two axes perpendicular to each other and therefore realizing an accurate image by suppressing the deflection of the movable plate from the rotary axis.

APPLICATION EXAMPLE 1

This application example of the invention is directed to an optical scanner including: a movable section which has a light reflecting member with a light reflecting surface and which is rotatable around the central axis of rotation; at least a pair of movable beams extending from the movable section along the light reflecting surface; a displacement section which is connected to the movable beams and has a through hole including two fixed surfaces crossing each other; two driving beams which extend from the displacement section along a surface direction of the light reflecting surface so as to be perpendicular to the movable beams; a support section connected to each of the driving beams; a driving section which drives the displacement section; and a permanent magnet which is inserted in the through hole and is fixed to the two fixed surfaces.

In this case, since the permanent magnet inserted in the through hole is fixed to the fixed surfaces, the permanent magnet can be positioned and fixed to the desired position of the displacement section. Specifically, the dimensional centre of the permanent magnet in the X-axis direction and the dimensional centre of the permanent magnet in the Y-axis direction can be made to match the point of intersection between the central axes of rotation. In this case, the permanent magnet is inclined by applying an AC voltage from the power source to the coil. Accordingly, the displacement section is stably inclined around the central axis of rotation while deforming the driving beam by twisting without deviation from the central axis of rotation. As a result, since the movable beam is not inclined to bend due to deviation from the central axis of rotation, it is possible to rotate the movable section stably. Similarly, the dimensional centre of the permanent magnet in the X-axis direction and the dimensional centre of the permanent magnet in the Y-axis direction can be made to match the point of intersection between the central axes of rotation. Therefore, it is possible to rotate the movable section as described above.

APPLICATION EXAMPLE 2

In the optical scanner described above, it is preferable that the displacement section includes a stepped section formed outside a range surrounded by a surface which forms the through hole together with the two fixed surfaces.

In this case, since the stepped section is formed outside the range surrounded by the surface which forms the through hole together with the two fixed surfaces, the permanent magnet can be easily inserted into the through hole. In addition, when fixing the permanent magnet to the through hole of the displacement section, especially to the two fixed surfaces using an adhesive, the permanent magnet is pressed against the fixed surfaces. Accordingly, since the adhesive spreads to the two fixed surfaces and the stepped section, the space between the fixed surfaces and the permanent magnet can be made to be uniform. As a result, the permanent magnet can be positioned and fixed to the desired position of the displacement section.

APPLICATION EXAMPLE 3

In the optical scanner described above, it is preferable that the displacement section includes a relief section which is connected to the two fixed surfaces and is able to receive an adhesive or a part of the permanent magnet inside.

In this case, due to the relief section formed in contact with the two fixed surfaces, positioning between the through hole and the permanent magnet is not obstructed by the section which is in contact with the two fixed surfaces. Thus, since the permanent magnet is fixed to the fixed surfaces, the permanent magnet can be positioned and fixed to the desired position of the displacement section.

APPLICATION EXAMPLE 4

In the optical scanner described above, it is preferable that the displacement section includes a mark indicating the fixed surface.

In this case, the fixed surfaces can be accurately checked without making a mistake. Since the permanent magnet is fixed to the fixed surfaces in this state, the permanent magnet can be positioned and fixed to the desired position of the displacement section.

APPLICATION EXAMPLE 5

This application example of the invention is directed to a method of manufacturing an optical scanner including: forming a mirror chip; applying an adhesive to a through hole; inserting a permanent magnet into the through hole; and pressing the permanent magnet against two fixed surfaces. The mirror chip includes: a movable section which has a light reflecting member with a light reflecting surface and which is rotatable around the central axis of rotation; at least a pair of movable beams extending from the movable section along the light reflecting surface; a displacement section which is connected to the movable beams and has the through hole including the two fixed surfaces crossing each other; two driving beams which extend from the displacement section along a surface direction of the light reflecting surface so as to be perpendicular to the movable beams; and a support section connected to each of the driving beams.

In this case, when fixing the permanent magnet to the through hole of the displacement section, especially to the two fixed surfaces using an adhesive, the permanent magnet is pressed against the fixed surfaces. Accordingly, the permanent magnet can be positioned and fixed to the desired position of the displacement section.

APPLICATION EXAMPLE 6

This application example of the invention is directed to an image forming apparatus including: a light source; and an optical scanner which scans light from the light source. The optical scanner includes: a movable section which has a light reflecting member with a light reflecting surface and which is rotatable around the central axis of rotation; at least a pair of movable beams extending from the movable section along the light reflecting surface; a displacement section which is connected to the movable beams and has a through hole including two fixed surfaces crossing each other; two driving beams which extend from the displacement section along a surface direction of the light reflecting surface so as to be perpendicular to the movable beams; a support section connected to each of the driving beams; a driving section which drives the displacement section; and a permanent magnet which is inserted in the through hole and is fixed to the two fixed surfaces.

In this case, it is possible to provide a projector as an image forming apparatus capable of achieving the same effects as those described above.

APPLICATION EXAMPLE 7

In the image forming apparatus described above, it is preferable that the displacement section includes a stepped section formed outside a range surrounded by a surface which forms the through hole together with the two fixed surfaces.

In this case, since the stepped section is formed outside the range surrounded by the surface which forms the through hole together with the two fixed surfaces, the permanent magnet can be easily inserted into the through hole. In addition, when fixing the permanent magnet to the through hole of the displacement section, especially to the two fixed surfaces using an adhesive, the permanent magnet is pressed against the fixed surfaces. Accordingly, since the adhesive spreads to the two fixed surfaces and the stepped section, the space between the fixed surfaces and the permanent magnet can be made to be uniform. As a result, the permanent magnet can be positioned and fixed to the desired position of the displacement section.

APPLICATION EXAMPLE 8

In the image forming apparatus described above, it is preferable that the displacement section includes a relief section which is connected to the two fixed surfaces and is able to receive an adhesive or a part of the permanent magnet inside.

In this case, due to the relief section formed in contact with the two fixed surfaces, positioning between the through hole and the permanent magnet is not obstructed by the section which is in contact with the two fixed surfaces. Thus, since the permanent magnet is fixed to the fixed surfaces, the permanent magnet can be positioned and fixed to the desired position of the displacement section.

APPLICATION EXAMPLE 9

In the image forming apparatus described above, it is preferable that the displacement section includes a mark indicating the fixed surface.

In this case, the fixed surfaces can be accurately checked without making a mistake. Since the permanent magnet is fixed to the fixed surfaces in this state, the permanent magnet can be positioned and fixed to the desired position of the displacement section.

BRIEF DESCRIPTION OF THE DRAWINGS

The invention will be described with reference to the accompanying drawings, wherein like numbers reference like elements.

FIGS. 9A and 9B are views for explaining driving of the optical scanner according to the first embodiment.

FIGS. 10A and 10B are views for explaining driving of the optical scanner according to the first embodiment.

FIGS. 12A and 12B are views for explaining driving of the optical scanner according to the first embodiment.

DESCRIPTION OF EXEMPLARY EMBODIMENTS

Hereinafter, examples of an optical scanner and an image forming apparatus according to preferred embodiments of the invention will be described.

Figure 1:
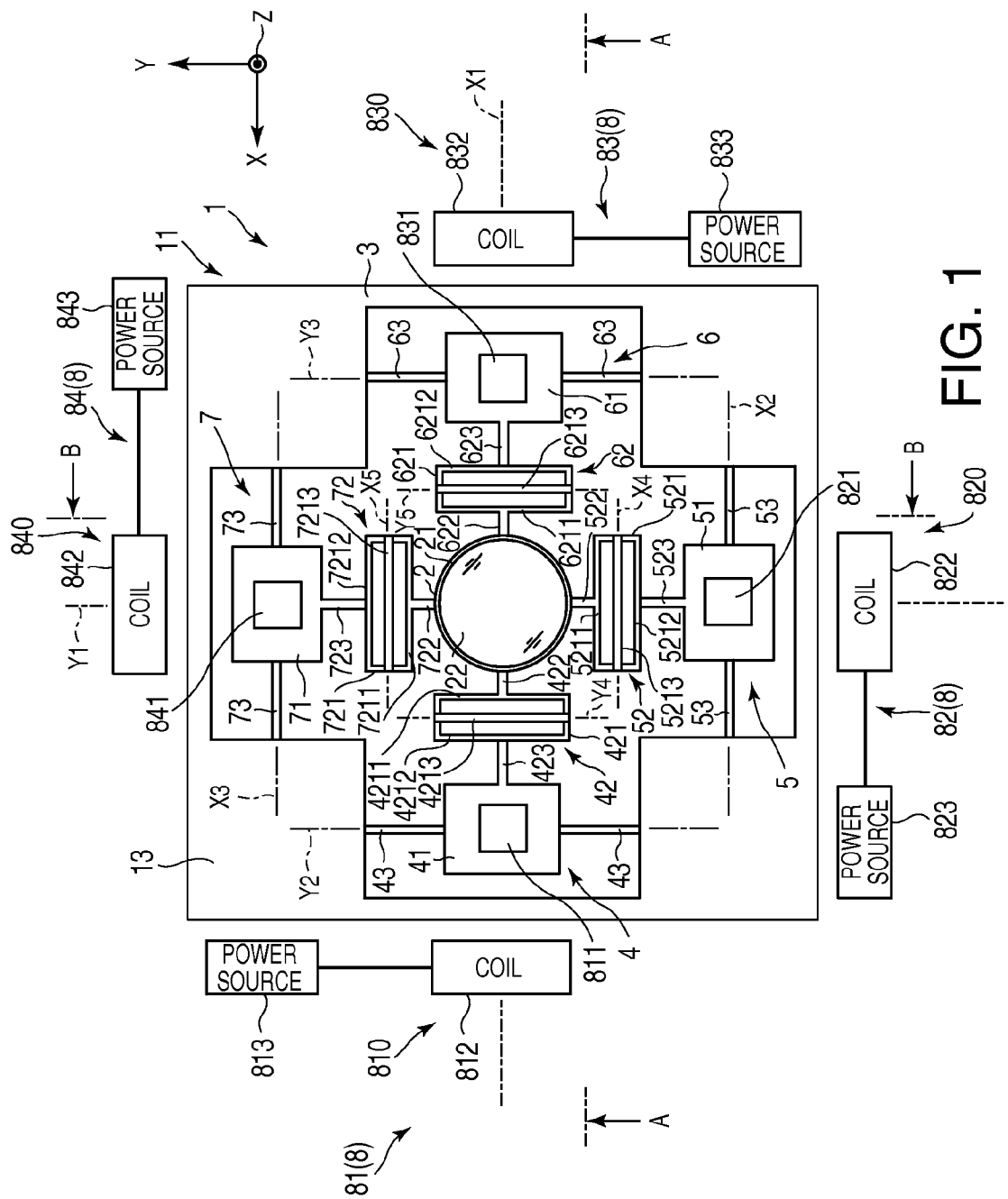
FIG. 1 is a schematic plan view showing an optical scanner according to a first embodiment.

For convenience of explanation, the left side, the right side, the upper side, and the lower side in drawings are termed below "left", "right", "top", and "down", respectively. Moreover, as shown in FIG. 1, three axes crossing each other are set as X, Y, and Z axes. A surface of a movable section in a non-driven state and a plane formed by the X and Y axes are equal (parallel), and the thickness direction of the movable section is the same as the Z axis. In addition, a direction parallel to the X axis is called "X-axis direction", a direction parallel to the Y axis is called "Y-axis direction", and a direction parallel to the Z axis is called "Z-axis direction".

First Embodiment

An optical scanner according to a first embodiment will be described.

Figure 2:
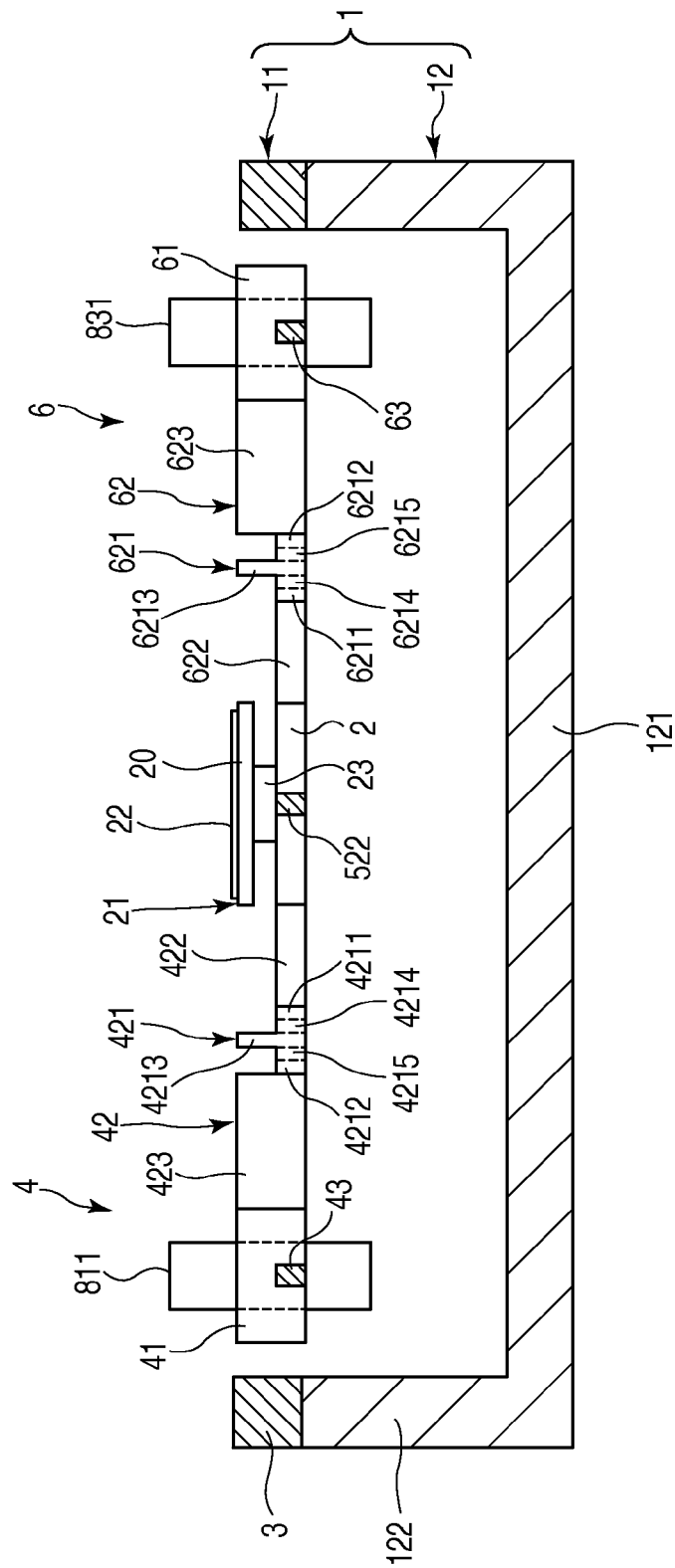
FIG. 2 is a cross-sectional view of the optical scanner according to the first embodiment (cross-sectional view taken along the line A-A of FIG. 1).

An optical scanner 1 shown in FIGS. 1 and 2 includes: a movable section 2; a light reflecting member 20 supported by the movable section 2; a vibration substrate 11 formed by a support section 3 which supports the movable section 2 and four connecting sections 4, 5, 6, and 7 which connects the movable section 2 and the support section 3 to each other; a pedestal 12 which supports the vibration substrate 11; and displacement unit 8 for displacing the movable section 2. Hereinafter, each configuration of the optical scanner 1 will be described in detail in a sequential manner.

1-1. Vibration Substrate 11

In the first embodiment, the vibration substrate 11 (that is, the movable section 2, the support section 3, and the four connecting sections 4, 5, 6, and 7) is integrally formed by removing an unnecessary part of an SOI substrate by various etching methods, such as dry etching and wet etching.

The support section 3 has a function of supporting the movable section 2. The support section 3 has a frame shape and is provided to surround the periphery of the movable section 2. The support section 3 includes a fixed section 13 at four corners. In addition, the shape of the support section 3 is not particularly limited as long as it can support the movable section 2. For example, a pair of support sections 3 may be provided so as to be opposite each other in the X-axis direction or the Y-axis direction with the movable section 2 interposed therebetween. Alternatively, the support section 3 may not be provided between a displacement section 41 of the connecting section 4 and a coil 812 (driving section 810), between a displacement section 51 of the connecting section 5 and a coil 822 (driving section 820), between a displacement section 61 of the connecting section 6 and a coil 832 (driving section 830), and/or between a displacement section 71 of the connecting section 7 and a coil 842 (driving section 840). In this case, each fixed section 13 is connected by driving beams 43, 53, 63, and 73.

The movable section 2 is provided inside the support section 3. The movable section 2 has a flat plate shape. In addition, the light reflecting member 20 including a support member 23 is disposed in the movable section 2. The light reflecting member 20 has a flat plate shape, and a light reflecting section 22 with light reflectivity is formed on one surface (surface not facing the pedestal 12) 21 of the light reflecting member 20. In addition, by fixing the support member 23 to the movable section 2 using an adhesive or the like, the light reflecting member 20 is supported by the movable section 2. The light reflecting section 22 is obtained by forming a metal film, such as gold, silver, or aluminum, on the surface 21 by vapor deposition, for example.

In addition, although the movable section 2 has a circular shape in XY plane view in the first embodiment, the shape of the movable section 2 in XY plane view is not particularly limited to this. For example, the shape of the movable section 2 in XY plane view may be polygonal, such as a triangle, a rectangle, or a square, or an ellipse.

Such a movable section 2 is connected to the support section 3 by the four connecting sections 4, 5, 6, and 7. The four connecting sections 4, 5, 6, and 7 are disposed at equal distances along the circumferential direction of the movable section 2, that is, at angles of 90° in XY plane view of the movable section 2.

In addition, among the four connecting sections 4, 5, 6, and 7, the connecting sections 4 and 6 are formed opposite each other in the X-axis direction with the movable section 2 interposed therebetween and are also formed symmetrically with respect to the movable section 2, and the connecting sections 5 and 7 are formed opposite each other in the Y-axis direction with the movable section 2 interposed therebetween and are also formed symmetrically with respect to the movable section 2. Since the connecting sections 4, 5, 6, and 7 support the movable section 2, it is possible to support the movable section 2 in a stable state.

The four connecting sections 4, 5, 6, and 7 have the same configuration.

Specifically, the connecting section (first connecting section) 4 includes a displacement section 41, a movable beam 42, and a pair of driving beams 43. The movable beam 42 connects the displacement section 41 and the movable section 2 to each other. The driving beam 43 connects the displacement section 41 and the support section 3 to each other.

In addition, the connecting section (third connecting section) 5 includes a displacement section 51, a movable beam 52, and a pair of driving beams 53. The movable beam 52 connects the displacement section 51 and the movable section 2 to each other. The driving beam 53 connects the displacement section 51 and the support section 3 to each other.

In addition, the connecting section (second connecting section) 6 includes a displacement section 61, a movable beam 62, and a pair of driving beams 63. The movable beam 62 connects the displacement section 61 and the movable section 2 to each other. The driving beam 63 connects the displacement section 61 and the support section 3 to each other.

Similarly, the connecting section (fourth connecting section) 7 includes a displacement section 71, a movable beam 72, and a pair of driving beams 73. The movable beam 72 connects the displacement section 71 and the movable section 2 to each other. The driving beam 73 connects the displacement section 71 and the support section 3 to each other.

In addition, the "same configuration" described above means that constituting elements of the connecting section are the same. Accordingly, the external shapes may not necessarily be the same.

By forming each of the connecting sections 4, 5, 6, and 7 in this way, the configuration of each connecting section becomes simple and rotation of the movable section 2 around the central axes of rotation X1 and Y1 can be performed smoothly.

Hereinafter, the connecting sections 4, 5, 6, and will be specifically described. However, since the connecting sections 4, 5, 6, and 7 have the same configuration, the connecting section 4 will be representatively described, and explanation regarding the other connecting sections 5, 6, and 7 will be omitted. In addition, the connecting sections 5 and 7 are disposed in a state rotated by 90° with respect to the connecting section 4 in XY plane view of the movable section 2. Therefore, the connecting sections 5 and 7 can also be described by changing the "Y-axis direction" to the "X-axis direction" and the "X-axis direction" to the "Y-axis direction" in the following explanation regarding the connecting section 4.

Figure 3:
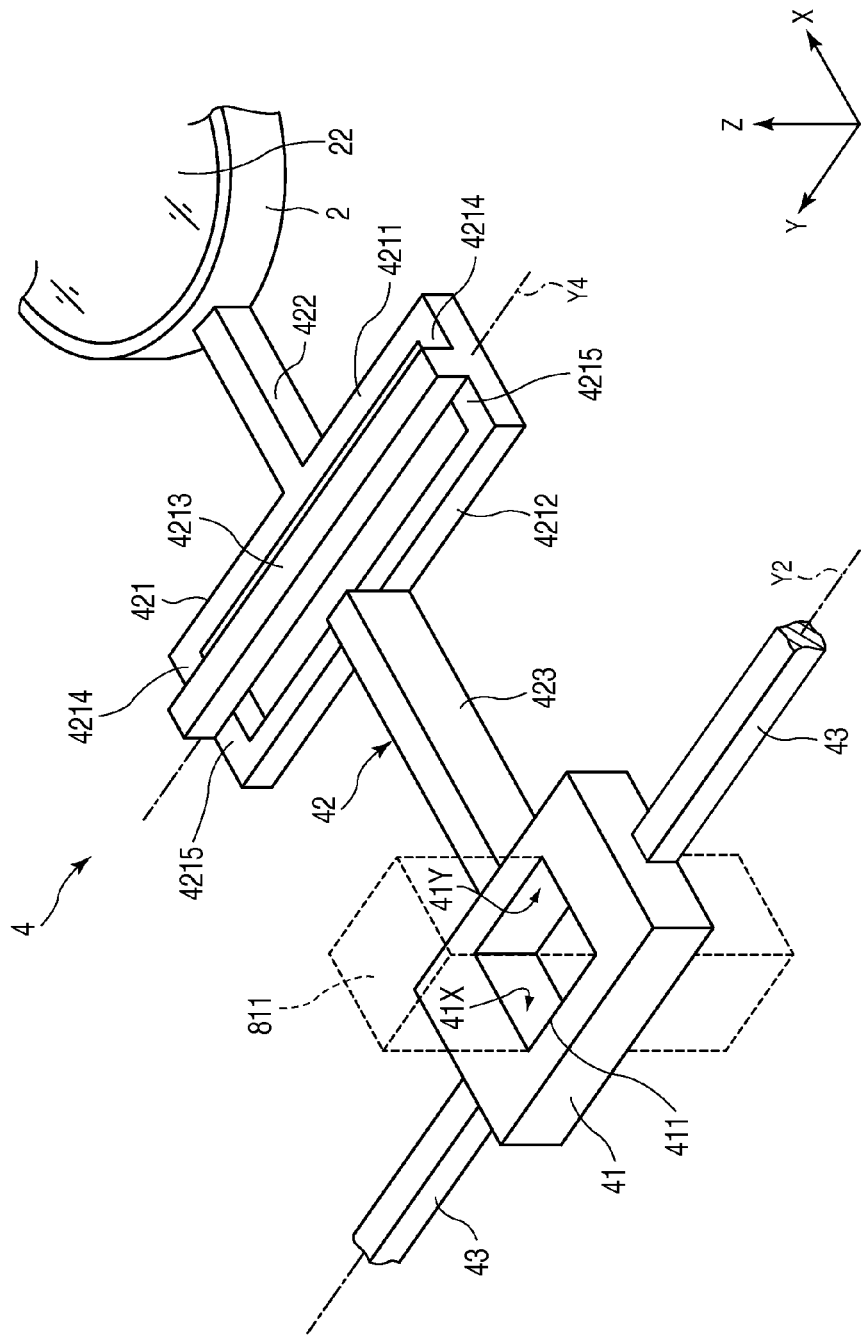
FIG. 3 is a perspective view of a connecting section provided in the optical scanner according to the first embodiment.

As shown in FIG. 3, the two driving beams 43 are disposed opposite each other in the Y-axis direction with the displacement section 41 interposed therebetween and support the displacement section 41 at both ends. In addition, each of the pair of driving beams 43 has a rod shape extending in the Y-axis direction. In addition, the pair of driving beams 43 can be deformed by twisting around the central axis of the driving beam 43. The two driving beams 43 are coaxially provided. With this axis (also called the "central axis of rotation Y2") as the centre, the two driving beams 43 are twisted and deformed and the displacement section 41 rotates.

The displacement section 41 is provided so as to be spaced apart from the movable section 2 in the X-axis direction. In addition, the displacement section 41 is supported at both ends by the two driving beams 43 as described above. A through hole 411 is formed in such a displacement section 41, and a permanent magnet 811 is inserted and fixed to the through hole 411. The permanent magnet 811 is fixed to the displacement section 41 using an adhesive 44, for example. The adhesive 44 is formed of an epoxy resin or an acrylic resin and is cured by heating or ultraviolet irradiation.

Figure 4A:
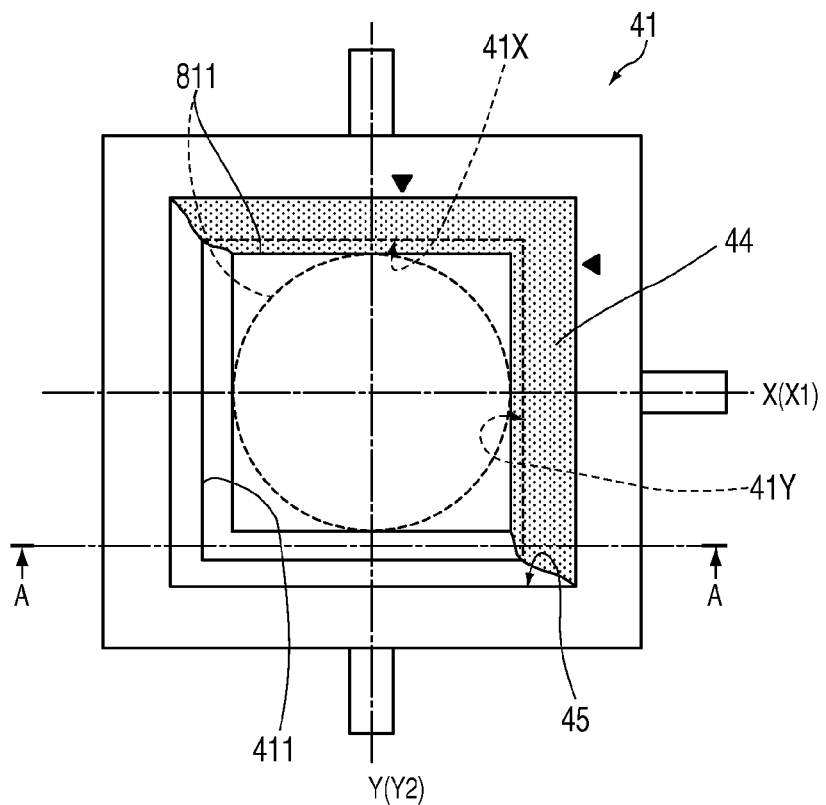
FIGS. 4A and 4B are schematic XY plane views of a connecting section provided in the optical scanner according to the first embodiment.
Figure 4B:
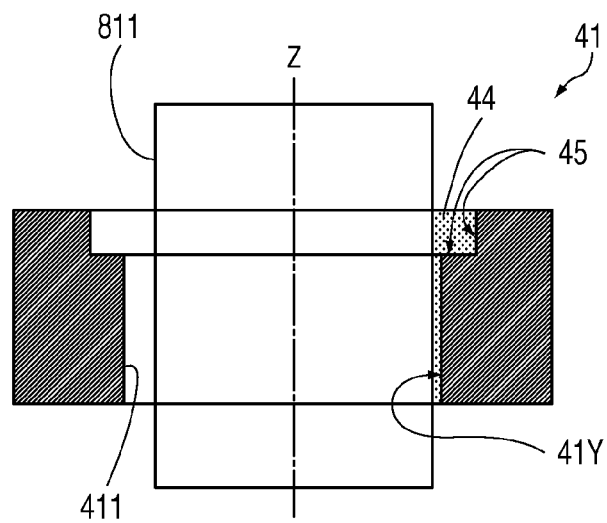

As shown in FIGS. 4A and 4B, the through hole 411 includes alignment surfaces (fixed surfaces) 41X and 41Y and a stepped section 45. As shown in FIG. 4A, the stepped section 45 is formed outside the range surrounded by the surface, which forms the through hole 411 together with the alignment surfaces 41X and 41Y, in XY plane view. Marks (black triangles in the drawing) indicating the alignment surfaces 41X and 41Y are formed in the displacement section 41. The alignment surfaces 41X and 41Y are formed so as to cross each other. In FIGS. 4A and 4B, the alignment surfaces 41X and 41Y are formed so as to be perpendicular to each other.

The alignment surfaces 41X and 41Y are formed such that the alignment surface 41X regulates positioning of the permanent magnet 811 in the X-axis direction and the alignment surface 41Y regulates positioning of the permanent magnet 811 in the Y-axis direction. Specifically, the alignment surfaces 41X and 41Y are formed so as to be spaced apart from the central axes of rotation X1 and Y2 by half of the size of the permanent magnet 811 in the X-axis direction and the half of the size of the permanent magnet 811 in the Y-axis direction.

In this way, the permanent magnet 811 is pressed against the alignment surfaces 41X and 41Y and is fixed to the through hole 411 by the adhesive 44. As a result, the dimensional centre of the permanent magnet 811 in the X-axis direction and the dimensional centre of the permanent magnet 811 in the Y-axis direction are positioned so as to match the point of intersection between the central axes of rotation X1 and Y2. Here, although the shape of the permanent magnet 811 in XY plane view is a rectangle shown by a solid line in FIG. 4A or a circle shown by dotted lines in FIG. 4A, the shape is not particularly limited and may be appropriately determined to include a polygon or an ellipse.

The adhesive 44 is injected or applied to the stepped section 45, especially at the outside of the alignment surfaces 41X and 41Y. In addition, the adhesive 44 is injected or applied to the through hole 411, especially to the alignment surfaces 41X and 41Y. Here, the adhesive 44 may be injected or applied not only at the outside of the alignment surfaces 41X and 41Y but also at the outside of a surface which forms the through hole 411 together with the alignment surfaces 41X and 41Y. In addition, since the adhesive 44 is injected or applied to the stepped section 45 as described above, the adhesive 44 may not be injected or applied to the through hole 411 unlike those described above. This may be appropriately determined.

In addition, the length of the stepped section 45 expressed as the sizes in the X-axis direction and the Y-axis direction in FIG. 4A, the depth of the stepped section 45 expressed as the size in the Z-axis direction in FIG. 4B, the cross-sectional shape of the stepped section 45 shown in FIG. 4B, and the amount of the injected or applied adhesive 44 may be appropriately determined in consideration of the bonding strength for fixing the permanent magnet 811 and the displacement section 41 and the like.

Permanent magnets 821, 831, and 841 are fixed to the displacement sections 51, 61, and 71 by the adhesive 44, similar to the displacement section 41. In addition, each of the displacement sections 51, 61, and 71 includes the alignment surfaces 41X and 41Y and the stepped section 45 similar to the displacement section 41. In addition, similar to the permanent magnet 811, the permanent magnets 821, 831, and 841 are positioned by being fixed to the alignment surfaces 41X and 41Y. Referring to FIG. 1 for more detailed explanation, the dimensional centre of the permanent magnet 821 in the X-axis direction and the dimensional centre of the permanent magnet 821 in the Y-axis direction are set to match the point of intersection between the central axes of rotation X2 and Y1. In addition, the dimensional centre of the permanent magnet 831 in the X-axis direction and the dimensional centre of the permanent magnet 831 in the Y-axis direction are set to match the point of intersection between the central axes of rotation X1 and Y3. Similarly, the dimensional centre of the permanent magnet 841 in the X-axis direction and the dimensional centre of the permanent magnet 841 in the Y-axis direction are set to match the point of intersection between the central axes of rotation X3 and Y1.

Next, a method of fixing the permanent magnet 811 to the displacement section 41 will be described with reference to FIGS. 6A to 7.

First, an application step (S101) is executed.

Figure 6A:
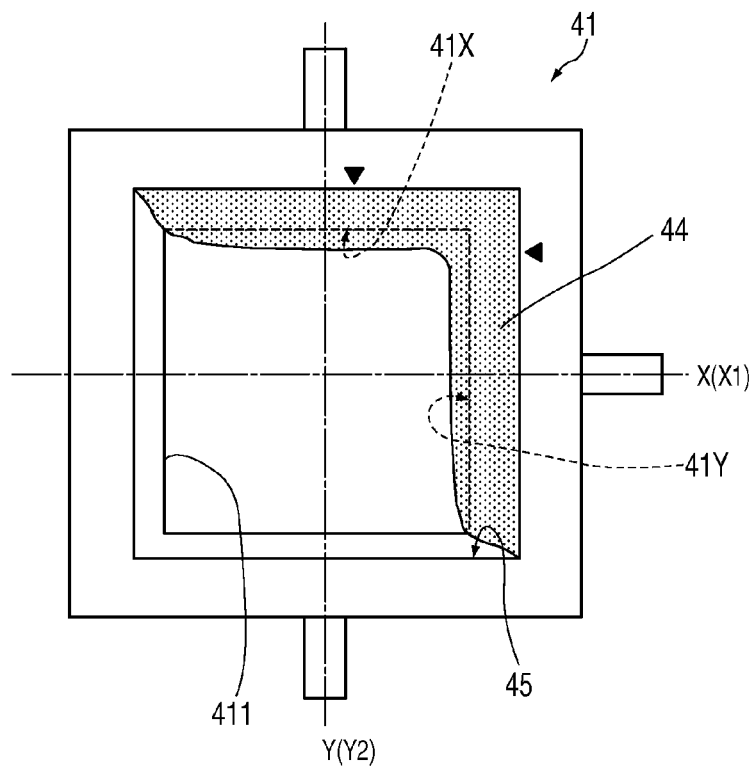
FIGS. 6A and 6B are schematic process views showing the method of manufacturing the optical scanner according to the first embodiment.

As shown in FIG. 6A, the adhesive 44 is injected or applied to the stepped section 45, especially at the outside of the alignment surfaces 41X and 41Y. Then, the adhesive 44 is injected or applied to the through hole 411, especially to the alignment surfaces 41X and 41Y, as well as the stepped section 45. Here, the adhesive 44 may be injected or applied not only at the outside of the alignment surfaces 41X and 41Y but also at the outside of a surface which forms the through hole 411 together with the alignment surfaces 41X and 41Y.

Then, an insertion step (S102) is executed.

Figure 6B:
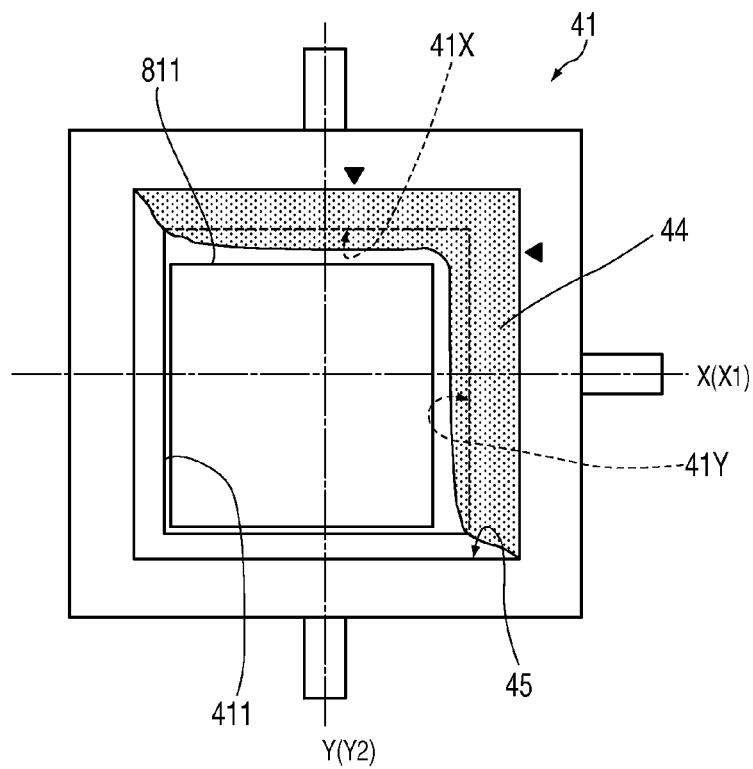

As shown in FIG. 6B, the permanent magnet 811 is inserted into the through hole 411. In particular, the permanent magnet 811 is inserted into the through hole 411 so as to be close to the side of the surface which forms the through hole 411, that is, so as to be close to the side distant from the alignment surfaces 41X and 41Y.

Then, a pressing step (S103) is executed.

Figure 7:
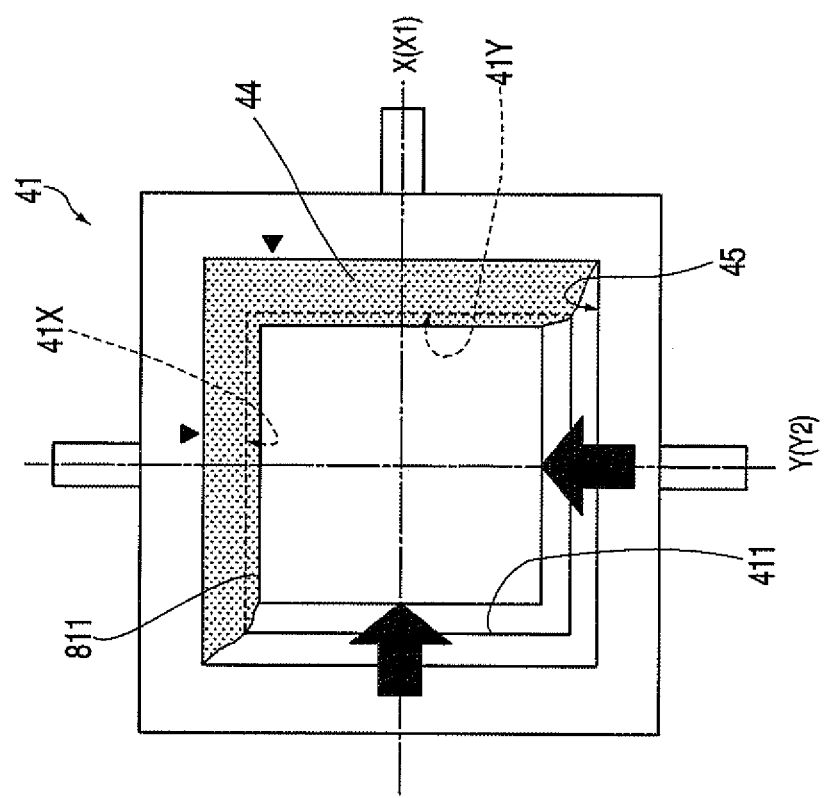
FIG. 7 is a schematic process view showing the method of manufacturing the optical scanner according to the first embodiment.

As shown in FIG. 7, the permanent magnet 811 is pressed in the black arrow directions so as to be pressed against the alignment surfaces 41X and 41Y.

Then, a curing step (S104) is executed to cure the adhesive 44 by heating or ultraviolet irradiation.

Accordingly, the permanent magnet 811 is fixed to the through hole 411. As a result, the permanent magnet 811 is fixed to the displacement section 41 by the adhesive 44.

Then, a magnetization step (S105) is executed. Accordingly, one end of the permanent magnet 811 in the Z-axis direction serves as an N pole and the opposite side serves as an S pole.

The order of the application step (S101) and the insertion step (S102) is not limited to the above-described order, and the application step (S101) may also be executed after the insertion step (S102).

Through the steps executed as described above, the permanent magnet 811 is fixed by the adhesive 44 on the surface which forms the through hole 411 together with the alignment surfaces 41X and 41Y and the alignment surfaces 41X and 41Y in addition to the stepped section 45. As a result, the bonding strength is improved. Alternatively, in the case of executing the application step (S101) after the insertion step (S102), it becomes possible to regulate positioning in a state where the permanent magnet 811 is indirect contact with the alignment surfaces 41X and 41Y.

The magnetization step (S105) may be executed, for example, before the application step (S101) or the insertion step (S102) without being limited to above-described order, or may be appropriately determined.

In addition, in the first embodiment, the shape of the displacement section 41 in plan view is a rectangle having a longitudinal side in the Y-axis direction. By forming the displacement section 41 in such a shape, it is possible to suppress the width (length in the X-axis direction) of the displacement section 41 while ensuring the space for fixing the permanent magnet 811. By suppressing the width of the displacement section 41, the moment of inertia generated when the displacement section 41 rotates around the central axis of rotation Y2 can be suppressed. As a result, since the reactivity of the displacement section 41 increases, further high-speed rotation becomes possible. In addition, if the reactivity of the displacement section 41 increases, it is possible to suppress the occurrence of unwanted vibration caused by the rotation of the displacement section 41 (especially at the time of turning back at which the rotation direction changes). Therefore, it is possible to stably drive the optical scanner 1.

In addition, the shape of the displacement section 41 in plan view is not particularly limited. For example, the shape of the displacement section 41 in plan view may be a triangle, a square, or polygons of five sides or more or may be a circle.

The displacement section 41 is connected to the movable section 2 by the movable beam 42. The movable beam 42 is provided so as to extend in the X-axis direction on the whole. The movable beam 42 includes a bending section 421 provided between the displacement section 41 and the movable section 2, a movable section side movable beam 422, and a displacement section side movable beam 423. The movable section side movable beam 422 connects the bending section 421 and the movable section 2 to each other, and the displacement section side movable beam 423 connects the bending section 421 and the displacement section 41 to each other.

Each of the movable section side movable beam 422 and the displacement section side movable beam 423 has a rod shape extending in the X-axis direction. In addition, the movable section side movable beam 422 and the displacement section side movable beam 423 are coaxially provided.

The hardness of the displacement section side movable beam 423 of these two shafts is preferably set such that the displacement section side movable beam 423 is not greatly deformed when driving the optical scanner 1. More preferably, the hardness of the displacement section side movable beam 423 is set such that the displacement section side movable beam 423 is not substantially deformed. In contrast, the movable section side movable beam 422 can be deformed by twisting around the central axis. Thus, the movable beam 42 has a hard section which is not substantially deformed and a section which is located at its distal side and is deformable by twisting. Accordingly, it is possible to rotate the movable section 2 stably around each of the X and Y axes. In addition, "not deformed" as stated above means that being bent or curved in the Z-axis direction and deformation by twisting around the central axis do not occur substantially.

The movable section side movable beam 422 and the displacement section side movable beam 423 are connected to each other through the bending section 421. The bending section 421 has a function as a joint when the movable beam 42 is deformed by bending and a function of reducing (absorbing) the torque generated by torsional deformation of the movable section side movable beam 422 in order to prevent or suppress the transfer of the torque to the displacement section side movable beam 423.

As shown in FIG. 3, the bending section 421 includes: a pair of deformable sections 4211 and 4212; a non-deformable section 4213 provided between the pair of deformable sections 4211 and 4212; a pair of connecting sections 4214 which connects the deformable section 4211 to the non-deformable section 4213; and a pair of connecting sections 4215 which connects the deformable section 4212 to the non-deformable section 4213.

The non-deformable section 4213 has a rod shape extending in the Y-axis direction. The hardness of the non-deformable section 4213 is set such that the non-deformable section 4213 is not substantially deformed when driving the optical scanner 1. In this way, the movable beam 42 can be made to bend with the central axis Y4 of the non-deformable section 4213 as the centre. As a result, since the bending section 421 can function as a joint reliably, it is possible to drive the optical scanner 1 stably.

The pair of deformable sections 4211 and 4212 is disposed symmetrically with respect to the non-deformable section 4213. Each of the deformable sections 4211 and 4212 has a rod shape extending in the Y-axis direction. In addition, the deformable sections 4211 and 4212 are provided in parallel so as to be spaced apart from each other in the X-axis direction. Each of the deformable sections 4211 and 4212 can be deformed by twisting around the central axis.

The deformable section 4211 located at the movable section 2 side is connected to one end of the movable section side movable beam 422 at its approximate centre in the longitudinal direction and is also connected to the non-deformable section 4213 through the pair of connecting sections 4214 at both ends. Similarly, the deformable section 4212 located at the displacement section 41 side is connected to one end of the displacement section side movable beam 423 at its approximate centre in the longitudinal direction and is also connected to the non-deformable section 4213 through the pair of connecting sections 4215 at both the ends.

One of the pair of connecting sections 4214 connects one end of each of the deformable section 4211 and the non-deformable section 4213 to each other, and the other connecting section connects the other ends of the deformable section 4211 and the non-deformable section 4213 to each other. In addition, one of the pair of connecting sections 4215 connects one end of each of the deformable section 4212 and the non-deformable section 4213 to each other, and the other connecting section connects the other ends of the deformable section 4212 and the non-deformable section 4213 to each other.

Each of the connecting sections 4214 and 4215 has a rod shape extending in the X-axis direction. In addition, each of the connecting sections 4214 and 4215 can be bent in the Z-axis direction and can be deformed by twisting around the central axis.

Until now, the configuration of the vibration substrate 11 has been specifically described.

As described above, the vibration substrate 11 with such a configuration is integrally formed from the SOI substrate. Thus, the vibration substrate 11 can be easily formed. Specifically, an actively deformed section and a non-deformed section (section which does not need to be deformed) are present together in the vibration substrate 11 as described above. On the other hand, the SOI substrate is a substrate in which a first Si layer, an $SiO_2$ layer, and a second Si layer are laminated in this order. Therefore, by forming the non-deformed section with all of the three layers and forming the actively deformed section with only the second Si layer, that is, by setting the thickness of the SOI substrate differently, it is possible to easily form the vibration substrate 11 in which the deformed section and the non-deformed section are present together. In addition, the actively deformed section may be formed with two layers of the second Si layer and the $SiO_2$ layer.

The "deformed section" includes the driving beams 43, 53, 63, and 73, the movable section side movable beams 422, 522, 622, and 722, the deformable sections 4211, 4212, 5211, 5212, 6211, 6212, 7211, and 7212, and the connecting sections 4214, 4215, 5214, 5215, 6214, 6215, 7214, and 7215.

On the other hand, the "non-deformed section" includes the movable section 2, the support section 3, the displacement sections 41, 51, 61, and 71, the displacement section side movable beam 423, 523, 623, and 723, and the non-deformable sections 4213, 5213, 6213, and 7213.

1-2. Pedestal 12

As shown in FIG. 2, the pedestal 12 includes a flat base 121 and a frame section 122 provided along the edge of the base 121, and has a box shape (square shape). The pedestal 12 is bonded to the bottom surfaces of the support section 3 and the fixed section 13 (refer to FIG. 1) of the vibration substrate 11 by the frame section 122. Thus, the vibration substrate 11 is supported by the pedestal 12. The pedestal 12 is formed using glass or silicon as a main material, for example. In addition, a method of bonding the pedestal 12 and the support section 3 to each other is not particularly limited. For example, the pedestal 12 and the support section 3 may be bonded using an adhesive, or various bonding methods, such as anodic bonding, may be used. In addition, although the pedestal 12 has a box shape (square shape), the shape of the pedestal 12 is not limited to this, and the frame section 122 may be partially provided at the edge of the base 121.

1-3. Displacement Unit 8

As shown in FIG. 1, the displacement unit 8 includes first displacement unit 81, second displacement unit 82, third displacement unit 83, and fourth displacement unit 84.

The first displacement unit 81 includes a permanent magnet 811, a driving section 810 around which a coil 812 is wound, and a power source 813. The second displacement unit 82 includes a permanent magnet 821, a driving section 820 around which a coil 822 is wound, and a power source 823. The third displacement unit 83 includes a permanent magnet 831, a driving section 830 around which a coil 832 is wound, and a power source 833. The fourth displacement unit 84 includes a permanent magnet 841, a driving section 840 around which a coil 842 is wound, and a power source 843.

In addition, the first displacement unit 81 is provided corresponding to the connecting section 4, the second displacement unit 82 is provided corresponding to the connecting section 5, the third displacement unit 83 is provided corresponding to the connecting section 6, and the fourth displacement unit 84 is provided corresponding to the connecting section 7.

According to such a configuration, the configuration of the displacement unit 8 becomes simple. In addition, since a relatively large force can be generated by performing electromagnetic driving of the displacement unit 8, it is possible to rotate the movable section 2 more reliably. In addition, since one displacement unit 8 (81, 82, 83, 84) is provided in each of the connecting sections 4, 5, 6, and 7, each of the connecting sections 4, 5, 6, and 7 can be independently deformed. Therefore, the movable section 2 can be displaced in various ways.

Hereinafter, the first displacement unit 81, the second displacement unit 82, the third displacement unit 83, and the fourth displacement unit 84 will be described. However, since these have the same configuration, the first displacement unit 81 will be representatively described below, and explanation regarding the second displacement unit 82, the third displacement unit 83, and the fourth displacement unit 84 will be omitted. In addition, the second displacement unit 82 and the fourth displacement unit 84 are disposed in a state rotated by 90° with respect to the first displacement unit 81 in plan view of the movable section 2. Therefore, the second displacement unit 82 and the fourth displacement unit 84 can also be described by changing the "Y-axis direction" to the "X-axis direction" and the "X-axis direction" to the "Y-axis direction" in the following explanation regarding the first displacement unit 81.

Figure 8:
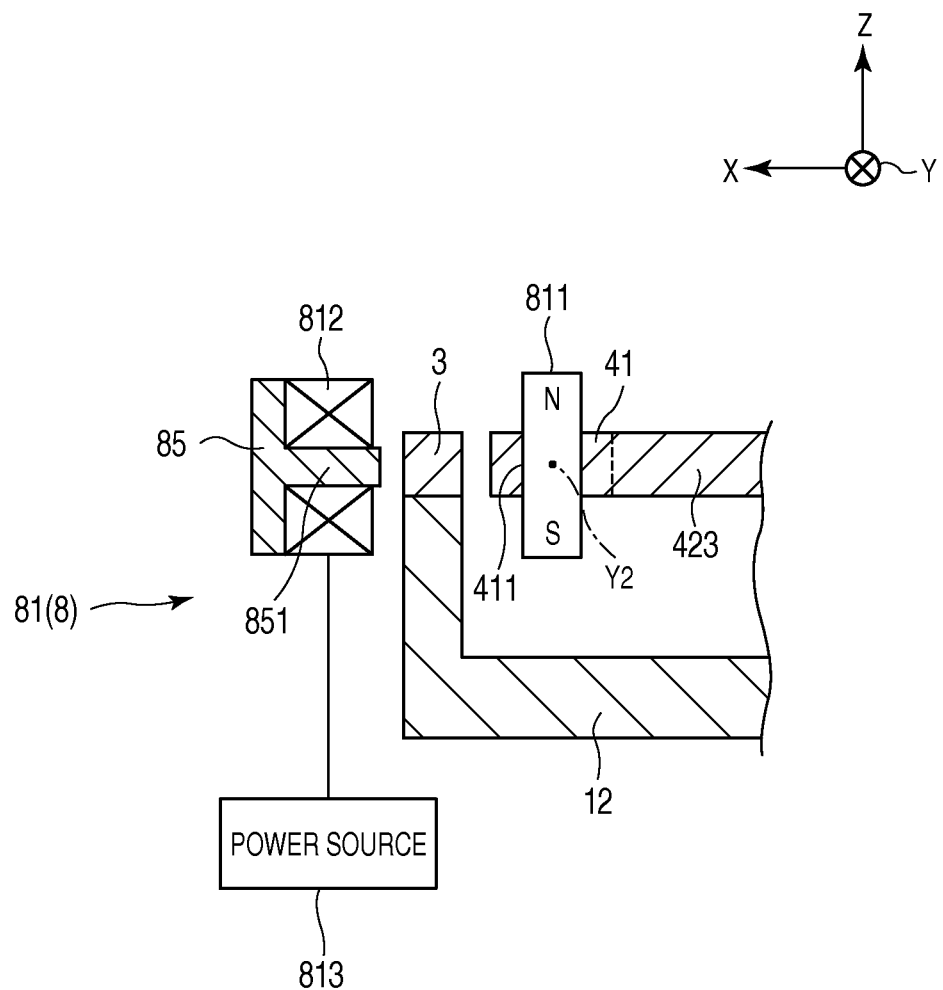
FIG. 8 is a view for explaining displacement unit provided in the optical scanner according to the first embodiment.

As shown in FIG. 8, the permanent magnet 811 has a rod shape and is magnetized in the longitudinal direction. That is, one end side of the permanent magnet 811 in the longitudinal direction serves as an S pole and the other end side serves as an N pole. The permanent magnet 811 is inserted into the through hole 411 formed in the displacement section and is fixed to the displacement section 41 at its approximate middle in the longitudinal direction. In addition, the permanent magnet 811 protrudes up and down from the displacement section 41 by the same length, and the S and N poles are opposite each other with the displacement section 41 (central axis of rotation Y2) interposed therebetween. In this manner, it is possible to displace the movable section 2 stably.

In addition, the permanent magnet 811 is provided such that the longitudinal direction is perpendicular to the surface direction of the displacement section 41. In addition, the permanent magnet 811 is provided such that the central axis crosses the central axis of rotation Y2.

The permanent magnet 811 is not particularly limited. For example, those magnetized with a hard magnetic material, such as a neodymium magnet, a ferrite magnet, a samarium cobalt magnet, an alnico magnet, a bond magnet, may be appropriately used.

In addition, although the permanent magnet 811 has a rod shape in the first embodiment, the shape of the permanent magnet is not particularly limited. For example, the permanent magnet 811 may have a plate shape or a cylindrical shape. In this case, it is preferable to magnetize the permanent magnet 811 in the surface direction and to fix the permanent magnet 811 to the displacement section 41 such that the surface direction is perpendicular to the X-axis direction. Then, since the length of the permanent magnet 811 in the X-axis direction can be shortened, the moment of inertia generated during the rotation of the displacement section 41 can be suppressed.

The coil 812 generates a magnetic field acting on the permanent magnet 811. The coil 812 is disposed near the outer side of the vibration substrate 11 so as to face the permanent magnet 811 in the X-axis direction. In addition, the coil 812 is provided so that the magnetic field in the X-axis direction can be generated, that is, a state where the permanent magnet 811 side of the coil 812 serves as an N pole and the opposite side serves as an S pole and a state where the permanent magnet 811 side of the coil 812 serves as an S pole and the opposite side serves as an N pole can occur.

The optical scanner 1 according to the first embodiment includes the pedestal 12 provided outside the vibration substrate 11 and a coil fixed section 85, which is provided in the driving section 810 (820, 830, 840) fixedly provided, and the coil 812 is wound around a protruding section 851 of the coil fixed section 85 which extends in the X-axis direction. Through such a configuration, the coil 812 can be fixed to the vibration substrate 11, and the magnetic field described above can be easily generated. In addition, by forming the protruding section 851 with a soft magnetic material, such as iron, the protruding section 851 can be used as a core of the coil 812. In this case, it is possible to generate the above-described magnetic field more efficiently.

The power source 813 is electrically connected to the coil 812. In addition, the above-described magnetic field can be generated from the coil 812 by applying a desired voltage from the power source 813 to the coil 812. In the first embodiment, the power source 813 can selectively apply an AC voltage or a DC voltage. In addition, when applying an AC voltage, the size and the frequency may be changed, and the offset voltage (DC voltage) may also be superimposed on the AC voltage.

2. Operation of the Optical Scanner 1

Next, the operation of the optical scanner 1 will be described.

In the optical scanner 1 with the configuration described above, it is possible to select a pattern for rotating the movable section 2, a pattern for vibrating the movable section 2, and a pattern of stopping the movable section 2 at the predetermined position. Thus, the effect that the optical scanner 1 can be driven in various patterns is obtained by deforming the movable beams 42, 52, 62, and 72 of the connecting sections 4, 5, 6, and 7 so as to be bent.

Hereinafter, these three patterns will be sequentially described. Moreover, for convenience of explanation, the configuration where all of the permanent magnet 811, 821, 831, and 841 are disposed with their N poles upward will be representatively described below.

2-1. Rotation

Rotation Around the Y Axis

Referring to FIGS. 9A and 9B, rotation around the Y axis of the movable section 2 will be described. In addition, FIGS. 9A and 9B are cross-sectional views corresponding to the cross-sectional view taken along the line A-A of FIG. 1.

First, AC voltages are applied from the power sources 813 and 833 to the coils 812 and 832 so that a first state, in which the permanent magnet 811 side of the coil 812 serves as an N pole and the permanent magnet 831 side of the coil 832 serves as an S pole, and a second state, in which the permanent magnet 811 side of the coil 812 serves as an S pole and the permanent magnet 831 side of the coil 832 serves as an N pole, are changed alternately and periodically. Preferably, the AC voltages applied from the power sources 813 and 833 to the coils 812 and 832 have the same waveform (the same size and frequency).

In the first state shown in FIG. 9A, the S pole of the permanent magnet 811 is attracted to the coil 812 and the N pole of the permanent magnet 811 becomes distant from the coil 812 and is inclined. Accordingly, the two driving beams 43 are twisted and deformed and the displacement section 41 is inclined around the central axis of rotation Y2 so that the top surface is located toward the movable section 2. At the same time, the N pole of the permanent magnet 831 is attracted to the coil 832 and the S pole of the permanent magnet 831 becomes distant from the coil 832 and is inclined. Accordingly, the two driving beams 63 are twisted and deformed and the displacement section 61 is inclined around the central axis of rotation Y3 so that the bottom surface is located toward the movable section 2. That is, both the displacement sections 41 and 61 are inclined in the clockwise direction in FIG. 9A.

At the same time as the inclination of the displacement sections 41 and 61, the displacement section side movable beam 423 is inclined such that the end at the movable section 2 side is located downward, and the displacement section side movable beam 623 is inclined such that the end at the movable section 2 side is located upward. As a result, the ends of the displacement section side movable beams 423 and 623 at the movable section 2 side are shifted in the Z-axis direction.

In addition, since the ends of the displacement section side movable beams 423 and 623 at the movable section 2 side are shifted in the Z-axis direction, the movable section side movable beams 422 and 622 and the movable section 2 are integrally inclined in the counterclockwise direction in FIG. 9A while deforming the deformable sections 4211, 4212, 6211, and 6212 by twisting around the central axis and deforming the connecting sections 4214, 4215, 6214, and 6215 so as to be bent.

Thus, in the first state, the movable beam 42 of the connecting section 4 is deformed by V-shaped downward bending (first deformation) at the bending section 421 located in the middle, and the movable beam 62 of the connecting section 6 is deformed by V-shaped upward bending (second deformation) at the bending section 621 located in the middle. As a result, the movable section 2 is inclined in the counterclockwise direction in FIG. 9A with the central axis of rotation Y1 as the centre.

On the other hand, in the second state shown in FIG. 9B, the opposite deformation to that in the first state described above occurs. That is, in the second state, the movable beam 42 of the connecting section 4 is deformed by V-shaped upward bending (second deformation) at the bending section 421, and the movable beam 62 of the connecting section 6 is deformed by V-shaped downward bending (first deformation) at the bending section 621. As a result, the movable section 2 is inclined in the clockwise direction in FIG. 9B with the central axis of rotation Y1 as the centre.

By changing the first and second states alternately and periodically, the movable section 2 can be made to rotate around the central axis of rotation Y1. In addition, the rotation of the movable section 2 around the central axis of rotation Y1 is allowed when the movable section side movable beams 522 and 722 provided in the connecting sections 5 and 7 are deformed by twisting around their central axes.

In addition, the frequency of the AC voltage applied to the coils 812 and 832 is not particularly limited, and may be set to be equal to or different from the resonance frequency of the vibration substrate 11 formed by the movable section 2 and the connecting sections 4, 5, 6, and 7. However, it is preferable to set the frequency of the AC voltage applied to the coils 812 and 832 to be different from the resonance frequency. That is, it is preferable to drive the optical scanner 1 in a non-resonant way. Thus, more stable driving of the optical scanner 1 becomes possible.

Rotation Around the X Axis

Next, rotation of the movable section 2 around the X axis will be described with reference to FIGS. 10A and 10B. In addition, FIGS. 10A and 10B are cross-sectional views corresponding to the cross-sectional view taken along the line B-B of FIG. 1.

First, AC voltages are applied from the power sources 823 and 843 to the coils 822 and 842 so that a first state, in which the permanent magnet 821 side of the coil 822 serves as an N pole and the permanent magnet 841 side of the coil 842 serves as an S pole, and a second state, in which the permanent magnet 821 side of the coil 822 serves as an S pole and the permanent magnet 841 side of the coil 842 serves as an N pole, are changed alternately and periodically. Preferably, the AC voltages applied from the power sources 823 and 843 to the coils 822 and 842 have the same waveform.

Similar to the rotation of the movable section 2 around the central axis of rotation Y1, in the first state shown in FIG. 10A, the movable beam 52 of the connecting section 5 is deformed by V-shaped downward bending (first deformation) at the bending section 521 located in the middle, and the movable beam 72 of the connecting section 7 is deformed by V-shaped upward bending (second deformation) at the bending section 721 located in the middle. As a result, the movable section 2 is inclined in the counterclockwise direction in FIG. 10A with the central axis of rotation X1 as the centre.

On the other hand, in the second state shown in FIG. 10B, the opposite deformation to that in the first state described above occurs. That is, in the second state, the movable beam 52 of the connecting section 5 is deformed by V-shaped upward bending (second deformation) at the bending section 521, and the movable beam 72 of the connecting section 7 is deformed by V-shaped downward bending (first deformation) at the bending section 721. As a result, the movable section 2 is inclined in the clockwise direction in FIG. 10B with the central axis of rotation X1 as the centre.

By changing the first and second states alternately and periodically, the movable section 2 can be made to rotate around the central axis of rotation X1. In addition, the rotation of the movable section 2 around the central axis of rotation X1 is allowed when the movable section side movable beams 422 and 622 provided in the connecting sections 4 and 6 are deformed by twisting around their central axes.

In addition, the frequency of the AC voltage applied to the coils 822 and 842 is not particularly limited, and may beset to be equal to or different from the resonance frequency of the vibration substrate 11 formed by the movable section 2 and the connecting sections 4, 5, 6, and 7. However, it is preferable to set the frequency of the AC voltage applied to the coils 822 and 842 to be different from the resonance frequency. That is, it is preferable to drive the optical scanner 1 in a non-resonant way. Thus, more stable driving of the optical scanner 1 becomes possible.

Rotation Around Each of the X and Y Axes

The movable section 2 can be made to rotate in a two-dimensional manner around each of the central axis of rotation Y1 and the central axis of rotation X1 by performing the rotation around the X axis and the rotation around the Y axis simultaneously. As described above, the rotation of the movable section 2 around the central axis of rotation Y1 is allowed when the movable section side movable beams 522 and 722 are deformed by twisting around their central axes, and the rotation of the movable section 2 around the central axis of rotation X1 is allowed when the movable section side movable beams 422 and 622 are deformed by twisting around their central axes.

In the rotation around the X axis, the rotation around the Y axis, and the rotation around these two axes, the frequency of the AC voltage applied to the coils 812, 822, 832, and 842 is not particularly limited, and may be set to be equal to or different from the resonance frequency of the vibration substrate 11 formed by the movable section 2 and the connecting sections 4, 5, 6, and 7. However, it is preferable to set the frequency of the AC voltage applied to the coils 812, 822, 832, and 842 to be different from the resonance frequency. That is, it is preferable to drive the optical scanner 1 in a non-resonant way. Thus, more stable driving of the optical scanner 1 becomes possible.

In addition, the frequency of the AC voltage applied to the coils 812 and 832 in order to rotate the movable section 2 around the central axis of rotation Y1 may be set to be equal to or different from the frequency of the AC voltage applied to the coils 822 and 842 in order to rotate the movable section 2 around the central axis of rotation X1. For example, when it is necessary to rotate the movable section 2 around the central axis of rotation Y1 more quickly than around the central axis of rotation X1, it is preferable to set the frequency of the AC voltage applied to the coils 812 and 832 to be higher than the frequency of the AC voltage applied to the coils 822 and 842.

In addition, the size of the AC voltage applied to the coils 812 and 832 may be set to be equal to or different from the size of the AC voltage applied to the coils 822 and 842. For example, when it is necessary to rotate the movable section 2 around the central axis of rotation Y1 larger than the rotation around the central axis of rotation X1, it is preferable to set the size of the AC voltage applied to the coils 812 and 832 to be larger than the size of the AC voltage applied to the coils 822 and 842.

While the driving method of applying an AC voltage to the coils 812, 822, 832, and 842 has been described above, it is also possible to rotate the movable section 2 using the following driving method. That is, a positive or negative offset voltage (DC voltage) may be superimposed on the AC voltages applied from the power sources 813, 823, 833, and 843 to the coils 812, 822, 832, and 842. In other words, the force of each N pole of the permanent magnets 811, 821, 831, and 841 which is attracted to the coils 812, 822, 832, and 842 (simply referred to as "N pole attraction force") may be set to be different from the force of each S pole of the permanent magnets 811, 821, 831, and 841 which is attracted to the coils 812, 822, 832, and 842 (simply referred to as "S pole attraction force").

Hereinafter, specific explanation will be given. The above-described state where the N pole attraction force and the S pole attraction force are equal is called a "normal state".

Figure 11:
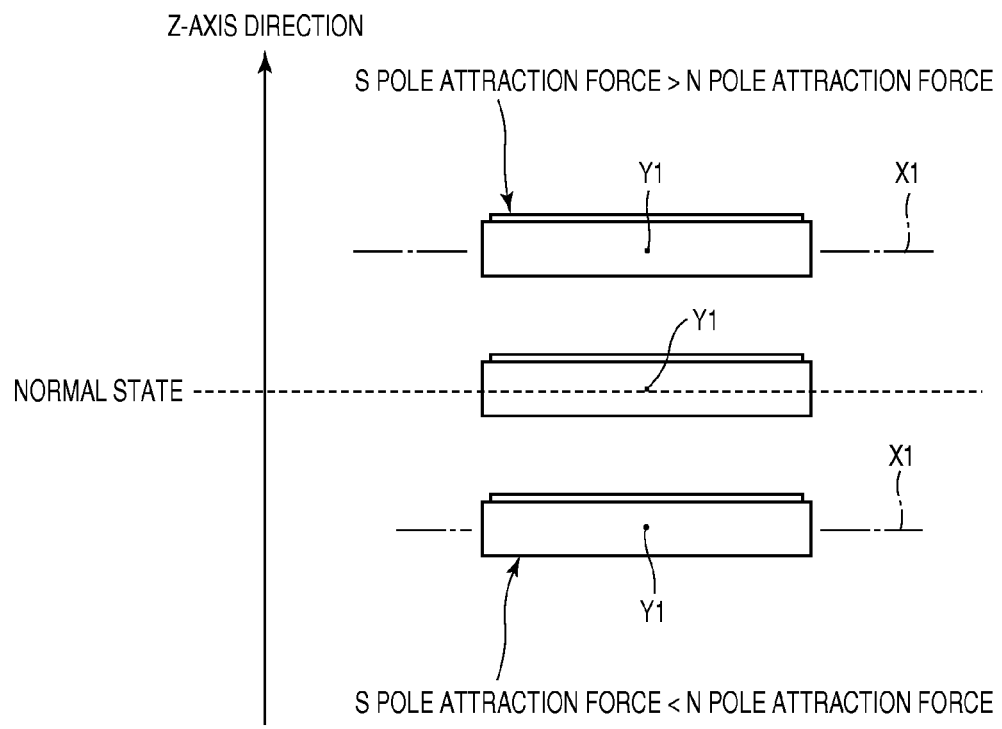
FIG. 11 is a view for explaining driving of the optical scanner according to the first embodiment.

When the S pole attraction force of the coils 812, 822, 832, and 842 is stronger than the N pole attraction force, upper and lower dead points (points at which the rotation direction changes) of rotation of the displacement sections 41, 51, 61, and 71 move upward compared with the normal state. As a result, the central axes of rotation X1 and Y1 of the movable section 2 move upward compared with the normal state, as shown in FIG. 11. On the contrary, when the S pole attraction force of the coils 812, 822, 832, and 842 is weaker than the N pole attraction force, the upper and lower dead points of rotation of the displacement sections 41, 51, 61, and 71 move downward compared with the normal state. As a result, the central axes of rotation X1 and Y1 of the movable section 2 move downward compared with the normal state.

Thus, the central axes of rotation X1 and Y1 of the movable section 2 can be shifted in the Z-axis direction by superimposing an offset voltage on the AC voltages applied from the power sources 813, 823, 833, and 843 to the coils 812, 822, 832, and 842. Accordingly, for example, when the optical scanner 1 is built into an image forming apparatus, such as a projector, the optical path length of light emitted from a light source up to the movable section 2 can be adjusted even after assembly of the image forming apparatus. That is, although positioning between the light source and the movable section 2 is accurately performed during assembly of the image forming apparatus, the positions of the light source and the movable section 2 can be corrected after assembly even if these positions are shifted from the set values.

2-2. Vibration

First, AC voltages are applied from the power sources 813, 823, 833, and 843 to the coils 812, 822, 832, and 842 so that a first state, in which the permanent magnets 811, 821, 831, and 841 sides of the coils 812, 822, 832, and 842 serve as N poles, and a second state, in which the permanent magnets 811, 821, 831, and 841 sides of the coils 812, 822, 832, and 842 serve as S poles, are changed alternately and periodically. Preferably, the AC voltages applied from the power sources 813, 823, 833, and 843 to the coils 812, 822, 832, and 842 have the same waveform.

In the first state shown in FIG. 12A, the displacement sections 41, 51, 61, and 71 are inclined around the central axes of rotation Y2, X2, Y3, and X3, respectively, such that the top surfaces are located toward the movable section 2, similar to the case of the rotation described above. According to the inclination of the displacement sections 41, 51, 61, and 71, each of the displacement section side movable beams 423, 523, 623, and 723 is inclined such that the end at the movable section 2 side is located downward. As a result, the movable beams 42, 52, 62, and 72 are bent at the bending sections 421, 521, 621, and 721, and the movable section side movable beams 422, 522, 622, and 722 and the movable section 2 integrally move downward while maintaining the posture (that is, the surface direction) of the movable section 2.

On the other hand, in the second state shown in FIG. 12B, the displacement sections 41, 51, 61, and 71 are inclined around the central axes of rotation Y2, X2, Y3, and X3, respectively, such that the bottom surfaces are located toward the movable section 2. According to the inclination of the displacement sections 41, 51, 61, and 71, each of the displacement section side movable beams 423, 523, 623, and 723 is inclined such that the end at the movable section 2 side is located upward. As a result, the movable beams 42, 52, 62, and 72 are bent at the bending sections 421, 521, 621, and 721, and the movable section side movable beams 422, 522, 622, and 722 and the movable section 2 integrally move upward while maintaining the posture of the movable section 2.

By changing the first and second states alternately, it is possible to vibrate the movable section 2 in the Z-axis direction while maintaining the posture of the movable section 2, that is, while maintaining the surface of the light reflecting section 22 in parallel to the X-Y plane.

In addition, the frequency of the AC voltage applied to the coils 812, 822, 832, and 842 is not particularly limited, and may be set to be equal to or different from the resonance frequency of the vibration substrate 11 formed by the movable section 2 and the connecting sections 4, 5, 6, and 7. However, it is preferable to set the frequency of the AC voltage applied to the coils 812, 822, 832, and 842 to be equal to the resonance frequency. That is, it is preferable to drive the optical scanner 1 in a resonant way. Thus, more stable driving of the optical scanner 1 becomes possible.

Also in such a vibration pattern, similar to the rotation pattern described above, it is possible to vibrate the movable section 2 so as to be shifted in the Z-axis direction from the natural state by superimposing an offset voltage on the AC voltage applied to the coils 812, 822, 832, and 842.

2-3. Stop Pattern

For example, DC voltages are applied from the power sources 813, 823, 833, and 843 to the coils 812, 822, 832, and 842 so as to be in a state where the permanent magnets 811, 821, 831, and 841 sides of the coils 812, 822, 832, and 842 serve as N poles. Preferably, the DC voltages applied from the power sources 813, 823, 833, and 843 to the coils 812, 822, 832, and 842 have the same size. When such voltages are applied to the coils 812, 822, 832, and 842, the movable section 2 stops in the state shown in FIG. 12A.

On the contrary, when DC voltages are applied from the power sources 813, 823, 833, and 843 to the coils 812, 822, 832, and 842 so as to be in a state where the permanent magnets 811, 821, 831, and 841 sides of the coils 812, 822, 832, and 842 serve as S poles, the movable section 2 stops in the state shown in FIG. 12B.

Thus, the movable section 2 can be maintained at the different positions from the natural state. According to such driving, for example, the optical path of light reflected by the light reflecting section 22 can be shifted from that in the natural state. This is especially effective when using the optical scanner 1 as an optical switch, for example.

Moreover, for example, when the optical scanner 1 is built into an image forming apparatus, such as a projector, reflection of a laser beam by the light reflecting section 22 is prevented by moving the movable section 2 to a different position (position not crossing the optical path of laser beams) from the natural state when it is necessary to stop the emission of laser beams to the outside of the apparatus because abnormal laser beams are emitted from the light source. As a result, the emission of laser beams to the outside of the apparatus can be prevented. In addition, the emission of laser beams to the outside of the apparatus may be prevented by displacing the movable section 2 to change the optical path of laser beams reflected by the light reflecting section 22. Accordingly, since it is not necessary to separately provide a safety mechanism for solving such a problem, the process of manufacturing the image forming apparatus becomes simple and the manufacturing costs can also be reduced.

As applications of such stopping of driving of the movable section 2, the sizes of DC voltages applied to the coils 812, 822, 832, and 842 may be set to be different in order to maintain the movable section 2 in a state inclined from the natural state. In addition, the movable section 2 may be irregularly displaced continuously or in a stepwise manner by changing the sizes of the DC voltages applied to the coils 812, 822, 832, and 842 independently and temporally. Such a driving method is especially effective when performing vector scanning of light reflected by the light reflecting section 22, for example.

Until now, driving of the optical scanner 1 has been described in detail.

In such an optical scanner 1, the rotation of the movable section 2 around the central axis of rotation Y1 and the rotation of the movable section 2 around the central axis of rotation X1 may be performed by the same mechanism. In addition, in the optical scanner 1, the rotation of the movable section 2 around the central axis of rotation Y1 and the rotation of the movable section 2 around the central axis of rotation X1 may be performed independently. That is, in the optical scanner 1, the rotation around the central axis of rotation Y1 is not influenced by the rotation around the central axis of rotation X1 but on the contrary, the rotation around the central axis of rotation X1 is not influenced by the rotation around the central axis of rotation Y1 either. Therefore, according to the optical scanner 1, it is possible to rotate the movable section 2 stably around each of the central axis of rotation Y1 and the central axis of rotation X1.

In addition, as described above, in the optical scanner 1, the rotation of the movable section 2 around the central axis of rotation Y1 is allowed when the movable section side movable beams 522 and 722 are deformed by twisting around their central axes, and the rotation of the movable section 2 around the central axis of rotation X1 is allowed when the movable section side movable beams 422 and 622 are deformed by twisting around their central axes. Thus, since the connecting sections 4, 5, 6, and 7 have the movable section side movable beams 422, 522, 622, and 722 which can be deformed by twisting around their central axes, respectively, it is possible to rotate the movable section 2 smoothly around each of the central axes of rotation X1 and Y1.

Moreover, in the optical scanner 1, the movable section side movable beams 422, 522, 622, and 722 are directly connected to the movable section 2. Accordingly, it is possible to rotate the movable section 2 around each of the central axes of rotation X1 and Y1 more smoothly or to vibrate the movable section 2 in the Z-axis direction more smoothly.

In addition, in the connecting section 4 of the optical scanner 1, the bending section 421 is provided as described above between the movable section side movable beam 422 which is twisted and deformed and the displacement section side movable beam 423 which should not be deformed. Accordingly, stress caused by the above-described torsional deformation is absorbed and reduced by deformation of the deformable sections 4211 and 4212 and the connecting sections 4214 and 4215 of the bending section 421. As a result, the stress is not transmitted to the displacement section side movable beam 423. That is, by providing the bending section 421, it is possible to reliably prevent the displacement section side movable beam 423 from being deformed by twisting around the central axis during the rotation of the movable section 2. The same is true for the other connecting sections 5, 6, and 7 other than the connecting section 4. Therefore, it is possible to rotate the movable section 2 smoothly around each of the central axes of rotation X1 and Y1.

In addition, breakage of the displacement section side movable beams 423, 523, 623, and 723 is effectively prevented. That is, in the rod-shaped member, it is technically clear that the breaking strength when stress in the Z-axis direction is added in a state where torsional deformation around the central axis occurs is lower than the breaking strength when the stress in the Z-axis direction is added in the natural state. Accordingly, by providing the bending sections 421, 521, 621, and 721 as described above so that the displacement section side movable beams 423, 523, 623, and 723 are not twisted and deformed, breakage of the displacement section side movable beams 423, 523, 623, and 723 can be effectively prevented.

In addition, in the connecting section 4, the displacement section side movable beam 423 is not substantially deformed. For this reason, stress caused by the rotation of the displacement section 41 can be efficiently used for the rotation of the movable section 2. The same is true for the other connecting sections 5, 6, and 7. Therefore, it is possible to rotate the movable section 2 with a large angle of rotation and with low power consumption or to vibrate the movable section 2 in the Z-axis direction with large amplitude.

In addition, in the connecting section 4, the bending section 421 has the non-deformable section 4213. Accordingly, the movable beam 42 can be bent with the non-deformable section 4213 as an axis. The same is true for the other connecting sections 5, 6, and 7. Therefore, since the movable beams 42, 52, 62, and 72 of the connecting sections 4, 5, 6, and 7 can be made to bend simply and reliably, it is possible to stably rotate and vibrate the movable section 2.

In addition, in the connecting section 4, the bending section 421 includes the deformable section 4211 connected to the movable section side movable beam 422 and the deformable section 4212 connected to the displacement section side movable beam 423. Accordingly, when the movable beam 42 is bent, stress caused by the bending can be effectively reduced because the deformable sections 4211 and 4212 are deformed by twisting around the central axis. The same is true for the other connecting sections 5, 6, and 7. Therefore, the movable beams 42, 52, 62, and 72 of the connecting sections 4, 5, 6, and 7 can be made to bend reliably, and breakage of the movable beams 42, 52, 62, and 72 can be prevented. That is, it is possible to stably drive the optical scanner 1.

In addition, in the connecting section 4, the bending section 421 has a pair of deformable sections 4211 and 4212. Accordingly, the following effects can also be obtained. That is, thermal expansion of the movable section side movable beam 422 and the displacement section side movable beam 423 which occurs due to heat generated from the coil 812 by application of an electric current or heat generated by light emitted to the light reflecting section 22, for example, can be allowed by deformation of the deformable sections 4211 and 4212. The same is true for the other connecting sections 5, 6, and 7. Therefore, in the optical scanner 1, it is possible to prevent or suppress the stress from being left on the vibration substrate 11. As a result, a desired vibration characteristic can be obtained without depending on the temperature.

According to the present embodiment, since the permanent magnet 811 inserted into the through hole 411 is fixed to the alignment surfaces 41X and 41Y, the permanent magnet 811 can be positioned and fixed to the desired position of the displacement section 41. Specifically, the dimensional centre of the permanent magnet 811 in the X-axis direction and the dimensional centre of the permanent magnet 811 in the Y-axis direction can be made to match the point of intersection between the central axes of rotation X1 and Y2. In this case, the permanent magnet 811 is inclined by applying AC voltages from the power sources 813 and 833 to the coils 812 and 832. Accordingly, the displacement section 41 is stably inclined around the central axis of rotation Y2 while deforming the driving beam 43 by twisting without deviation from the central axis of rotation Y2. As a result, since the movable beam 42 is not inclined to bend due to deviation from the central axis of rotation X1, it is possible to rotate the movable section 2 stably. Similarly, since the dimensional centre of each of the permanent magnets 821, 831, and 841 in the X-axis direction and the dimensional centre of each of the permanent magnets 821, 831, and 841 in the Y-axis direction can be made to match the point of intersection between the central axes of rotation X2 and Y1 (X1 and Y3 and X3 and Y1), it is possible to rotate the movable section 2 as described above.

According to this, since the stepped section 45 is formed outside a range surrounded by the surface which forms the through hole 411 together with the two alignment surfaces 41X and 41Y, the permanent magnet 811 can be easily inserted into the through hole 411. In addition, when fixing the permanent magnet 811 to the through hole 411 of the displacement section 41, especially to the two alignment surfaces 41X and 41Y using the adhesive 44 or the like, the permanent magnet 811 is pressed against the alignment surfaces 41X and 41Y. Accordingly, since the adhesive 44 spreads to the two alignment surfaces 41X and 41Y and the stepped section 45, the space between the alignment surfaces 41X and 41Y and the permanent magnet 811 can be made to be uniform. As a result, the permanent magnet 811 can be positioned and fixed to the desired position of the displacement section 41.

According to the present embodiment, the two alignment surfaces 41X and 41Y can be accurately checked without making a mistake. Since the permanent magnet 811 is fixed to the alignment surfaces 41X and 41Y in this state, the permanent magnet 811 can be positioned and fixed to the desired position of the displacement section 41.

According to this, when fixing the permanent magnet 811 to the through hole 411 of the displacement section 41, especially to the two alignment surfaces 41X and 41Y using the adhesive 44 or the like, the permanent magnet 811 is pressed against the alignment surfaces 41X and 41Y. Therefore, the permanent magnet 811 can be positioned and fixed to the desired position of the displacement section 41.

Second Embodiment

Figure 5:
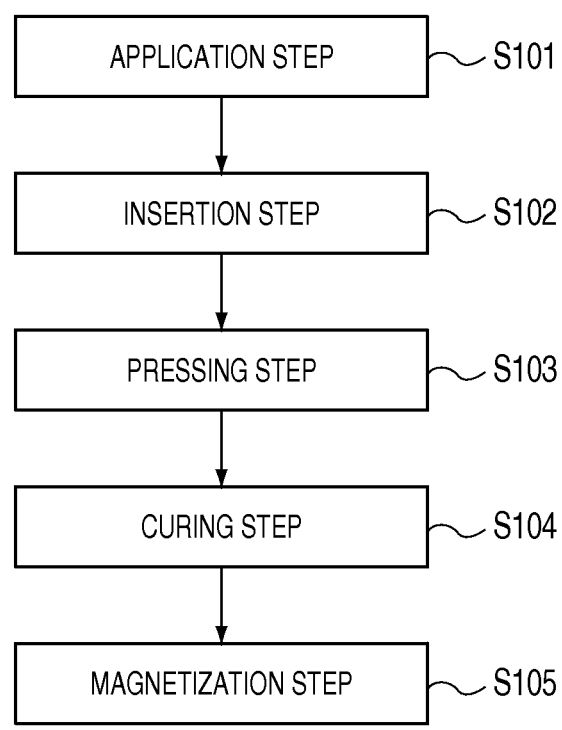
FIG. 5 is a flow chart showing a method of manufacturing the optical scanner according to the first embodiment.

An optical scanner according to a second embodiment will be described with reference to FIGS. 5, 13A, and 13B.

The optical scanner according to the second embodiment has almost the same configuration as in the first embodiment except for the configuration of a through hole. Accordingly, the same configuration and manufacturing method are denoted by the same reference numerals, and explanation regarding the configuration and the manufacturing method will be omitted.

Figure 13A:
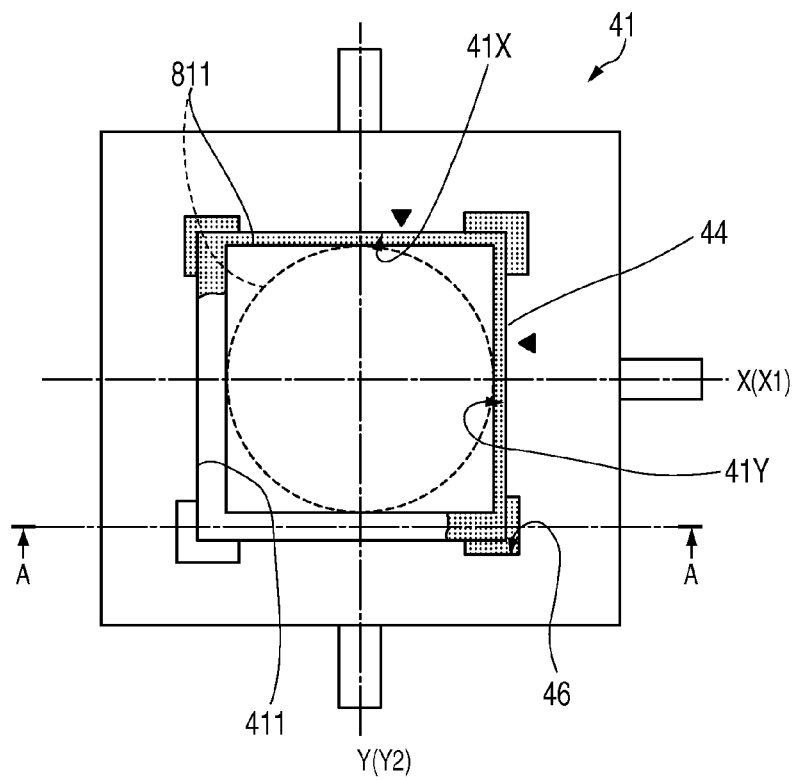
FIGS. 13A and 13B are schematic XY plane views of a connecting section provided in an optical scanner according to a second embodiment.
Figure 13B:
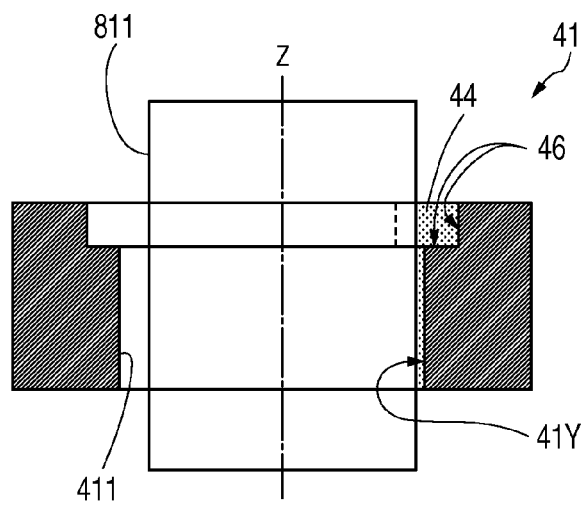

As shown in FIGS. 13A and 13B, the through hole 411 includes the alignment surfaces 41X and 41Y and a relief section 46. The relief section 46 is provided in contact with the two adjacent alignment surfaces 41X and 41Y. In addition to the relief section 46, three relief sections 46 are provided so as to be in contact with the surface which forms the through hole 411 together with the alignment surfaces 41X and 41Y. Alternatively, the relief section 46 may also be provided on the alignment surfaces 41X and 41Y and the surface which forms the through hole 411.

The adhesive 44 is injected or applied to the relief section 46. In addition, the adhesive 44 is injected or applied to the through hole 411, especially to the alignment surfaces 41X and 41Y. Here, the adhesive 44 may be injected or applied to the surface which forms the through hole 411 together with the alignment surfaces 41X and 41Y.

In addition, although the sizes of the relief sections 46 in XY plane view are shown as being equal in FIG. 13A, the sizes of the relief sections 46 may be different or may be appropriately determined without being limited thereto. The shape of the relief section 46 in XY plane view is not limited to the rectangular shape shown in FIG. 13A. For example, the shape of the relief section 46 in XY plane view may be a triangle or polygons of five sides or more, or may be a shape formed by curves, such as a circle or an ellipse. In addition, the length of the relief section 46 expressed as the sizes in the X-axis direction and the Y-axis direction in FIG. 13A, the depth of the relief section 46 expressed as the size in the Z-axis direction in FIG. 13B, the cross-sectional shape of the relief section 46 shown in FIG. 13B, and the amount of the injected or applied adhesive 44 may be appropriately determined in consideration of the bonding strength for fixing the permanent magnet 811 and the displacement section 41 and the like. In addition, the relief section 46 may pass through the displacement section 41, similar to the through hole 411. In addition, although the drawings and the above explanation are based on the four relief sections 46, the invention is not limited to this, and it is preferable to provide at least one relief section 46 so as to be in contact with the two adjacent alignment surfaces 41X and 41Y.

Next, a method of fixing the permanent magnet 811 to the displacement section 41 will be described with reference to FIG. 5.

An application step (S101) is executed to inject or apply the adhesive 44 to the relief section 46. In addition, the adhesive 44 is injected or applied to the through hole 411, especially to the alignment surfaces 41X and 41Y. Here, the adhesive 44 may be injected or applied to the surface which forms the through hole 411 together with the alignment surfaces 41X and 41Y.

Then, an insertion step (S102), a pressing step (S103), and a curing step (S104) are executed in the same manner as in the first embodiment. Accordingly, the permanent magnet 811 is fixed to the through hole 411. As a result, the permanent magnet 811 is fixed to the displacement section 41 by the adhesive 44.

Then, a magnetization step (S105) is executed. Accordingly, one end of the permanent magnet 811 in the Z-axis direction serves as an N pole and the opposite side serves as an S pole.

According to the present embodiment, the following effects can be achieved while achieving the same effects as in the first embodiment.

Since the relief section is formed in contact with the two adjacent alignment surfaces 41X and 41Y, positioning between the through hole 411 and the permanent magnet 811 is not obstructed by the section which is in contact with the two adjacent alignment surfaces. In this case, since the permanent magnet 811 is fixed to the alignment surfaces 41X and 41Y, the permanent magnet 811 can be positioned and fixed to the desired position of the displacement section 41.

Third Embodiment

An image forming apparatus according to a third embodiment will be described with reference to FIG. 14.

The image forming apparatus according to the third embodiment includes the optical scanner according to each of the first and second embodiments. Accordingly, the same configuration and manufacturing method are denoted by the same reference numerals, and explanation regarding the configuration and the manufacturing method will be omitted.

The optical scanner 1 described above may be appropriately applied to image forming apparatuses, such as a projector, a laser printer, a display device for imaging, a barcode reader, and a scanning type confocal microscope. FIG. 14 is a schematic view showing the outline of an image forming apparatus according to an embodiment of the invention. FIG. 14 shows a projector 200 as an image forming apparatus. Here, the longitudinal direction of a screen 280 is called a "horizontal direction" and the direction perpendicular to the longitudinal direction is called a "vertical direction". The projector 200 includes a light source device 210 which emits light, such as a laser beam, a plurality of dichroic mirrors 220, and the optical scanner 1.

The light source device 210 includes a red light source 211 which emits red light, a blue light source 212 which emits blue light, and a green light source 213 which emits green light. Each dichroic mirror 220 is an optical device which mixes laser beams emitted from each of the red light source 211, the blue light source 212, and the green light source 213. Such a projector 200 is configured such that laser beams emitted from the light source device 210 are mixed by the dichroic mirror 220 on the basis of the image information from a host computer (not shown), the mixed light is scanned in a two-dimensional manner by the optical scanner 1, and a color image is formed on the screen 280 through a fixed mirror 250.

At the time of two-dimensional scanning, the movable section 2 of the optical scanner 1 rotates around the axis in the Y-axis direction, and light reflected by the light reflecting section 22 of the movable section 2 is scanned in the horizontal direction of the screen 280 (main scanning). On the other hand, the movable section 2 of the optical scanner 1 rotates around the axis in the X-axis direction, and light reflected by the light reflecting section 22 is scanned in the vertical direction of the screen 280 (sub-scanning). Scanning of light using the optical scanner 1 may be performed by a so-called raster scan or may be performed by a so-called vector scan. In particular, since the vector scan is suitable for the optical scanner 1 from the point of view of the configuration, it is preferable to scan light using the vector scan.

The vector scan which is preferable for the optical scanner 1 is a method of scanning the light emitted from the light source device 210 on the screen 280 so that line segments which connect two different points on the screen 280 are sequentially formed. That is, the vector scan is a method of forming a desired image on the screen 280 by gathering small straight lines. The optical scanner 1 is especially suitable for the vector scan since it is possible to displace the movable section 2 irregularly and continuously around the axis in the Y-axis direction and around the axis in the X-axis direction.

Figure 14:
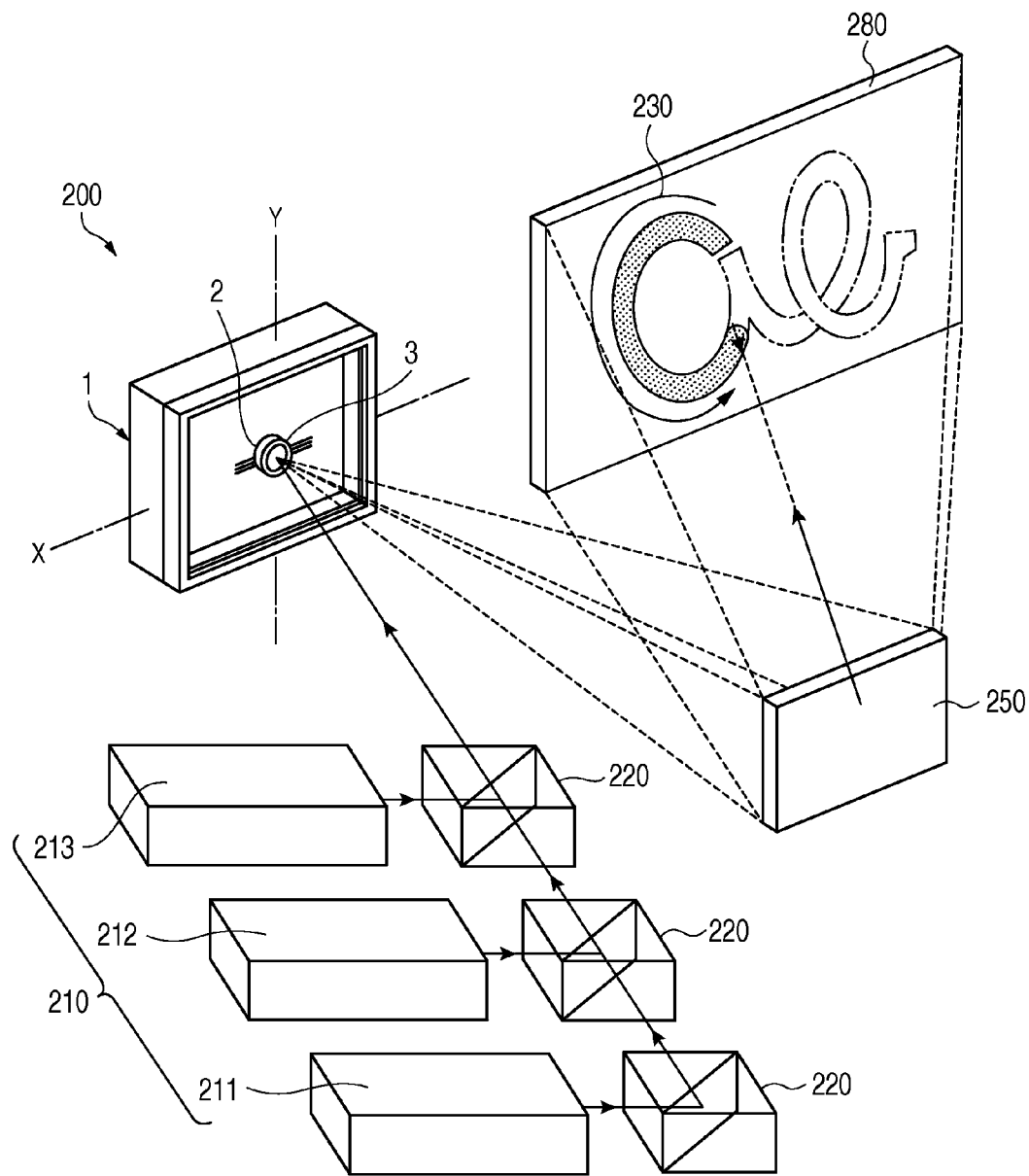
FIG. 14 is a schematic view showing the configuration of a projector according to a third embodiment.

Specifically, when drawing characters (a and b) shown in FIG. 14 by a vector scan, light emitted from the light source device 210 is scanned to write each character. In this case, by controlling the posture (rotation) of the movable section 2 in the optical scanner 1 around the axis in the X-axis direction and the posture (rotation) of the movable section 2 around the axis in the Y-axis direction, it is possible to scan the light irregularly along the scanning locus 230. As a result, the characters of a and b can be drawn with one stroke. According to such a vector scan, since it is not necessary to scan light on the entire screen 280 unlike the raster scan, an image can be efficiently drawn. In addition, a configuration is shown in FIG. 14 in which light mixed by the dichroic mirror 220 is scanned in a two-dimensional manner by the optical scanner 1 and then the light is reflected by the fixed mirror 250 to form an image on the screen 280. However, the fixed mirror 250 may not be provided, and the light scanned in a two-dimensional manner by the optical scanner 1 may be directly emitted to the screen 280.

According to the present embodiment, it is possible to provide the projector 200 as an image forming apparatus capable of achieving the same effects as in the first and second embodiments.

In addition, changes, improvements, and the like in the range where at least some of the above-described problems can be solved are included in the embodiments.

For example, for the alignment surfaces 41X and 41Y, the stepped section 45 may be formed outside the range surrounded by the surface which forms the through hole 411 together with the alignment surfaces 41X and 41Y. That is, the surface which forms the through hole 411 together with the alignment surfaces 41X and 41Y may be the same surface instead of the "outside the surrounded range" described above. In addition, the shape of the stepped section 45 in XY plane view is not limited to the rectangular shape shown in FIG. 4A. For example, the shape of the stepped section 45 in XY plane view may be a triangle or polygons of five sides or more, or may be a shape formed by curves, such as a circle or an ellipse.

The through hole 411 may have the shape shown in FIGS. 13A and 13B which includes the stepped section 45 shown in FIGS. 4A and 4B. Alternatively, the through hole 411 may have a shape not including the stepped section 45 shown in FIGS. 4A and 4B and the relief section 46 shown in FIGS. 13A and 13B. In this case, the permanent magnet 811 is fixed to the surface which forms the through hole 411 together with the alignment surfaces 41X and 41Y or to the XY surface of the displacement section 41 by the adhesive 44. Accordingly, the permanent magnet 811 is fixed to the displacement section 41.

In addition, the alignment surfaces 41X and 41Y of the through hole 411 are set such that the dimensional centre of each of the permanent magnets 811, 821, 831, and 841 in the X-axis direction and the dimensional centre of each of the permanent magnets 811, 821, 831, and 841 in the Y-axis direction match the point of intersection between the central axes of rotation X1 and Y2 (X2 and Y1, X1 and Y3, and X3 and Y1). However, the invention is not limited to this. For example, the dimensional centre of each of the permanent magnets 811, 821, 831, and 841 in the X-axis direction and/or the dimensional centre of each of the permanent magnets 811, 821, 831, and 841 in the Y-axis direction may be set to match the point of intersection between the central axes of rotation X1 and Y2 (X2 and Y1, X1 and Y3, and X3 and Y1) not only by the alignment surfaces 41X and 41Y but also by the other surface which forms the through hole 411.

In addition, the arrangement of the alignment surfaces 41X and 41Y is not limited to the arrangements shown in FIGS. 4A, 4B, 13A, and 13B, and it is also possible to adopt an arrangement rotated in XY plane view with respect to the Z axis passing through the point of intersection between the central axes of rotation X1 and Y2 (X2 and Y1, X1 and Y3, and X3 and Y1).

In other words, the arrangement of the alignment surfaces 41X and 41Y may be an arrangement in which the dimensional centre of the permanent magnet 811 in the X-axis direction and the dimensional centre of the permanent magnet 811 in the Y-axis direction match the point of intersection between the central axes of rotation X1 and Y2. In addition, the arrangement of the alignment surfaces 41X and 41Y may be an arrangement in which the dimensional centre of the permanent magnet 821 in the X-axis direction and the dimensional centre of the permanent magnet 821 in the Y-axis direction match the point of intersection between the central axes of rotation X2 and Y1. In addition, the arrangement of the alignment surfaces 41X and 41Y may be an arrangement in which the dimensional centre of the permanent magnet 831 in the X-axis direction and the dimensional centre of the permanent magnet 831 in the Y-axis direction match the point of intersection between the central axes of rotation X1 and Y3. In addition, the arrangement of the alignment surfaces 41X and 41Y may be an arrangement in which the dimensional centre of the permanent magnet 841 in the X-axis direction and the dimensional centre of the permanent magnet 841 in the Y-axis direction match the point of intersection between the central axes of rotation X3 and Y1.

Figure 15:
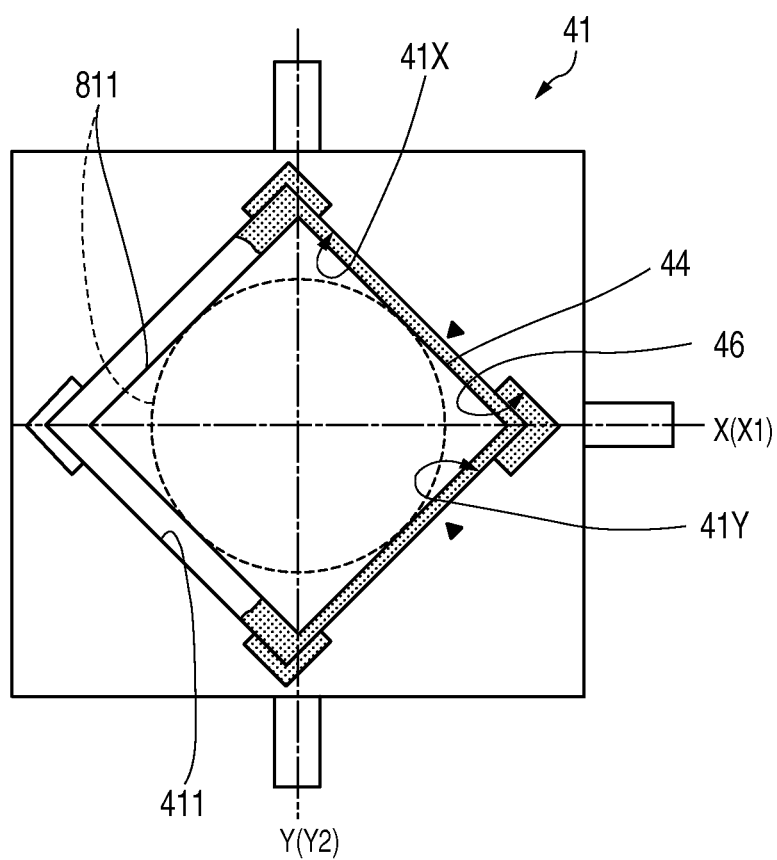
FIG. 15 is a schematic XY plane view of a connecting section provided in an optical scanner in a modification.

As an example of such an arrangement obtained by rotation, FIG. 15 shows an arrangement obtained by rotating the alignment surfaces 41X and 41Y, which are shown in FIGS. 13A and 13B, by 45° clockwise in XY plane view with respect to the Z axis passing through the point of intersection between the central axes of rotation X1 and Y2. Also in this case, the same effects as in the embodiments described above can be achieved.

In addition, the shape of the through hole 411 in XY plane view is not limited to the rectangular shape shown in FIGS. 1, 2, 4A, and 4B. For example, the shape of the through hole 411 in XY plane view may be a triangle, a square, or polygons of five sides or more if the shape has the alignment surfaces 41X and 41Y. Alternatively, the shape of the through hole 411 in XY plane view may be a fan shape including the alignment surfaces 41X and 41Y and an arc, or may be appropriately determined.

In addition, although the shapes of the permanent magnets 811, 821, 831, and 841 in XY plane view are shown as rectangular shapes in FIGS. 1, 3, 4A, 4B, 13A, and 13B, the shapes of the permanent magnets 811, 821, 831, and 841 in XY plane view are not particularly limited. For example, the shapes of the permanent magnets 811, 821, 831, and 841 in XY plane view may be triangles, squares, or polygons of five sides or more or may be circles shown by dotted lines in FIGS. 4A, 4B, 13A, 13B, and 15.

In addition, the configurations and shapes of the coil fixed section, the displacement unit, the stress reducing section, the vibration substrate, and the movable plate, inverting the vibration substrate as shown in the drawings and attaching the light reflecting member, and the like do not restrict the embodiments described above and may be appropriately changed.

The entire disclosure of Japanese Patent Application No. 2010-202768, filed Sep. 10, 2010 is expressly incorporated by reference herein.

What is claimed is:

1. An optical scanner comprising:
a movable section which has a light reflecting member with a light reflecting surface and which is rotatable around the central axis of rotation;
at least a pair of movable beams extending from the movable section along the light reflecting surface;
a displacement section which is connected to the movable beams and has a through hole including two fixed surfaces crossing each other;
two driving beams which extend from the displacement section along a surface direction of the light reflecting surface so as to be perpendicular to the movable beams;
a support section connected to each of the driving beams;
a driving section which drives the displacement section; and
a permanent magnet which is inserted in the through hole and is fixed to the two fixed surfaces.

2. The optical scanner according to claim 1,
wherein the displacement section includes a stepped section formed outside a range surrounded by a surface which forms the through hole together with the two fixed surfaces.

3. The optical scanner according to claim 1,
wherein the displacement section includes a relief section which is connected to the two fixed surfaces and is able to receive an adhesive or a part of the permanent magnet inside.

4. The optical scanner according to claim 1,
wherein the displacement section includes a mark indicating the fixed surface.

5. A method of manufacturing an optical scanner comprising:
forming a mirror chip;
applying an adhesive to a through hole;
inserting a permanent magnet into the through hole; and
pressing the permanent magnet against two fixed surfaces,
wherein the mirror chip includes:
a movable section which has a light reflecting member with a light reflecting surface and which is rotatable around the central axis of rotation;
at least a pair of movable beams extending from the movable section along the light reflecting surface;
a displacement section which is connected to the movable beams and has the through hole including the two fixed surfaces crossing each other;
two driving beams which extend from the displacement section along a surface direction of the light reflecting surface so as to be perpendicular to the movable beams; and
a support section connected to each of the driving beams.

6. An image forming apparatus comprising:
a light source; and
an optical scanner which scans light from the light source,
wherein the optical scanner includes:
a movable section which has a light reflecting member with a light reflecting surface and which is rotatable around the central axis of rotation;
at least a pair of movable beams extending from the movable section along the light reflecting surface;
a displacement section which is connected to the movable beams and has a through hole including two fixed surfaces crossing each other;
two driving beams which extend from the displacement section along a surface direction of the light reflecting surface so as to be perpendicular to the movable beams;
a support section connected to each of the driving beams;
a driving section which drives the displacement section; and
a permanent magnet which is inserted in the through hole and is fixed to the two fixed surfaces.

7. The image forming apparatus according to claim 6,
wherein the displacement section includes a stepped section formed outside a range surrounded by a surface which forms the through hole together with the two fixed surfaces.

8. The image forming apparatus according to claim 6,
wherein the displacement section includes a relief section which is connected to the two fixed surfaces and is able to receive an adhesive or a part of the permanent magnet inside.

9. The image forming apparatus according to claim 6,
wherein the displacement section includes a mark indicating the fixed surface.

* * * * *